United States Patent
Hwang

(10) Patent No.: US 12,085,715 B2
(45) Date of Patent: *Sep. 10, 2024

(54) METHOD AND SYSTEM FOR IMPLEMENTING PLATFORM FOR PROVIDING OFFLINE INFORMATION TO SMART GLASS

(71) Applicant: Piamond Corp., Busan (KR)

(72) Inventor: Doo Geon Hwang, Busan (KR)

(73) Assignee: Piamond Corp., Busan (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,535

(22) Filed: Nov. 1, 2023

(65) Prior Publication Data

US 2024/0069343 A1    Feb. 29, 2024

Related U.S. Application Data

(63) Continuation of application No. 18/087,986, filed on Dec. 23, 2022, now Pat. No. 11,841,506, which is a continuation of application No. 17/846,451, filed on Jun. 22, 2022, now Pat. No. 11,567,319.

(30) Foreign Application Priority Data

| Oct. 6, 2021 | (KR) | 10-2021-0132307 |
| Apr. 20, 2022 | (KR) | 10-2022-0048705 |
| Apr. 20, 2022 | (KR) | 10-2022-0048706 |
| Apr. 20, 2022 | (KR) | 10-2022-0048707 |

(51) Int. Cl.
*G02B 27/01* (2006.01)
*G06Q 20/32* (2012.01)
*H04L 9/08* (2006.01)

(52) U.S. Cl.
CPC ......... *G02B 27/017* (2013.01); *G06Q 20/321* (2020.05); *H04L 9/0894* (2013.01); *G02B 2027/014* (2013.01); *G02B 2027/0178* (2013.01)

(58) Field of Classification Search
CPC ............ G02B 27/017; G02B 2027/014; G02B 2027/0178; G06Q 20/321
See application file for complete search history.

(56) References Cited

U.S. PATENT DOCUMENTS

| 9,094,166 B2 | 7/2015 | Freda et al. |
| 10,530,853 B2 | 1/2020 | Fan |
| 10,710,609 B2 | 7/2020 | Saleh et al. |
| 10,984,601 B2 | 4/2021 | Moroze et al. |
| 11,282,061 B2 | 3/2022 | Jang et al. |
| 11,315,326 B2 | 4/2022 | Xu et al. |

(Continued)

*Primary Examiner* — Ryan A Lubit
(74) *Attorney, Agent, or Firm* — ArentFox Schiff LLP; Joseph M. Maraia; Marlo Schepper Grolnic

(57) ABSTRACT

Disclosed are a method and system for implementing a platform for providing offline information to smart glass. A computer device for implementing an information platform may include an information manager configured to manage service information to be exposed on smart glass based on service configuration information to be broadcasted through an information broadcasting device (IBD) registered by an information owner, and a content manager configured to distribute content, generated based on the managed service information, in a format configured in the smart glass.

9 Claims, 26 Drawing Sheets

(56) References Cited

U.S. PATENT DOCUMENTS

| | | | | |
|---|---|---|---|---|
| 2014/0164520 A1* | 6/2014 | Fan | .................. | H04W 4/50 |
| | | | | 709/204 |
| 2014/0258055 A1* | 9/2014 | Wolfe | .................. | G06Q 20/321 |
| | | | | 705/30 |
| 2017/0330174 A1* | 11/2017 | Demarinis | .......... | G06Q 20/3829 |
| 2018/0374127 A1* | 12/2018 | Walden | .............. | G06Q 30/0242 |
| 2020/0122742 A1* | 4/2020 | Saleh | ..................... | G01S 19/49 |
| 2020/0126309 A1* | 4/2020 | Moroze | ................... | G06F 3/017 |
| 2020/0202313 A1* | 6/2020 | Eidam | .................... | A61B 5/117 |
| 2020/0259638 A1* | 8/2020 | Carmignani | .............. | H04L 9/50 |
| 2021/0110610 A1* | 4/2021 | Xu | ........................ | G06V 20/20 |
| 2021/0216992 A1* | 7/2021 | Jang | .................. | G06Q 20/4014 |
| 2021/0298049 A1* | 9/2021 | Myung | ............. | H04W 72/1268 |
| 2021/0318993 A1* | 10/2021 | Biondo Junior | ...... | H04L 9/0894 |
| 2021/0356743 A1* | 11/2021 | Muldoon | ............. | G06F 3/0304 |
| 2021/0373649 A1* | 12/2021 | Moorjani | ............. | G02B 27/017 |
| 2022/0014041 A1* | 1/2022 | Knode | ................... | H05B 47/16 |
| 2022/0113813 A1* | 4/2022 | Ikeda | ................. | G06F 1/1626 |
| 2022/0237713 A1* | 7/2022 | Rosas-Maxemin | .... | G06Q 20/12 |
| 2023/0092175 A1* | 3/2023 | Yates | .................... | G06Q 20/24 |
| | | | | 705/14.36 |

\* cited by examiner

FIG. 13
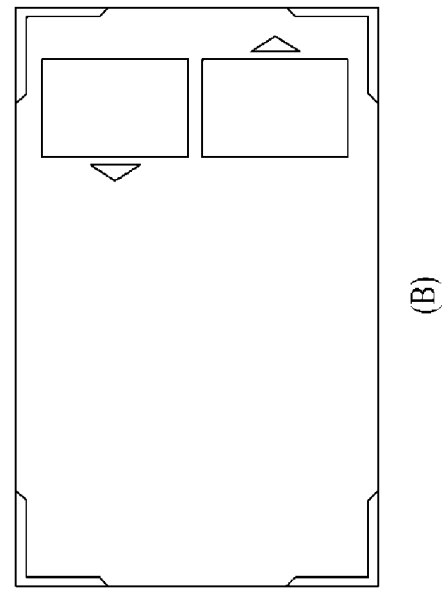
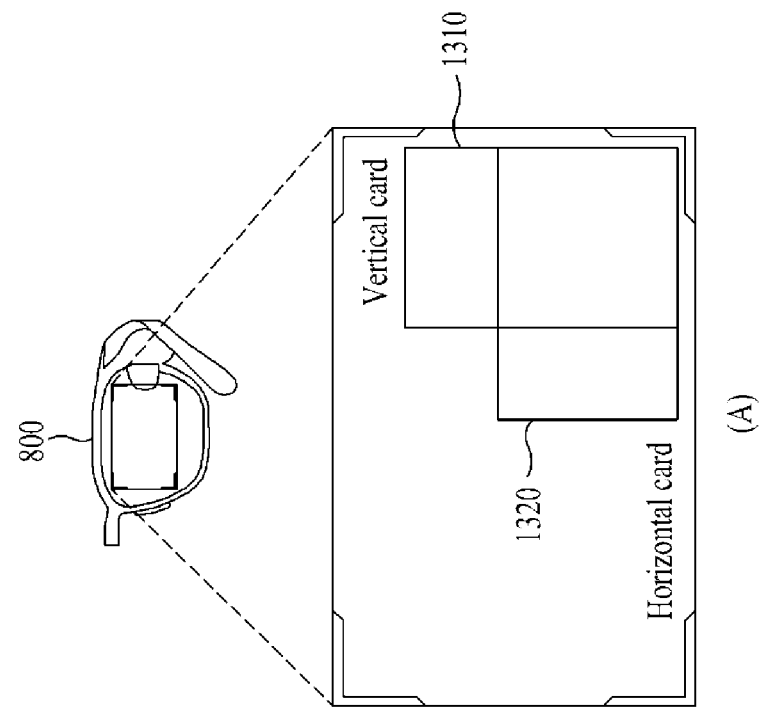

FIG. 14
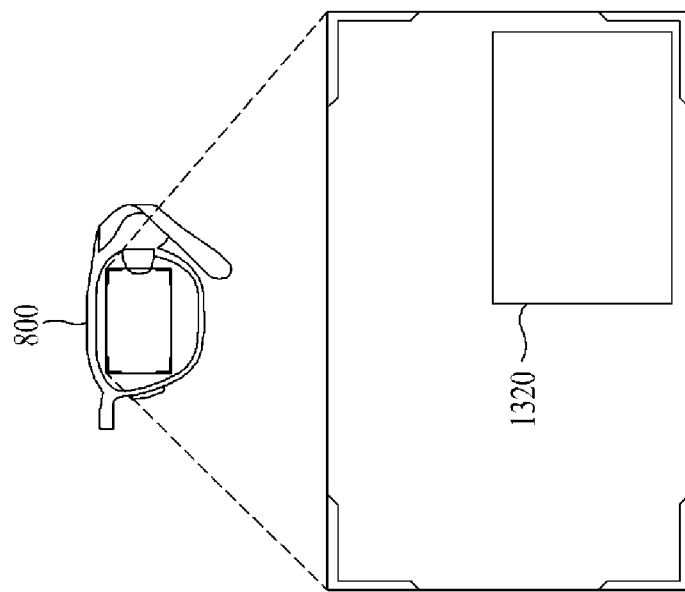
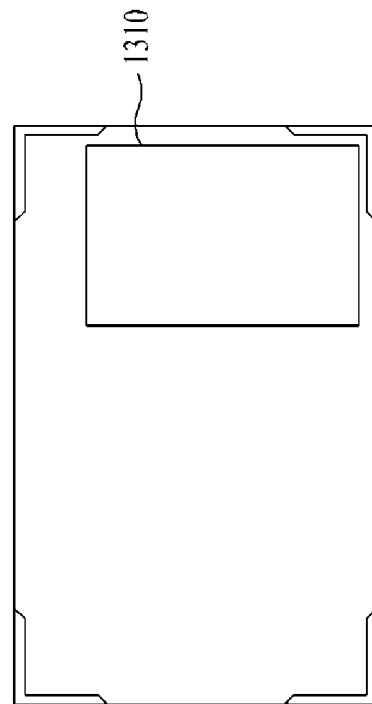

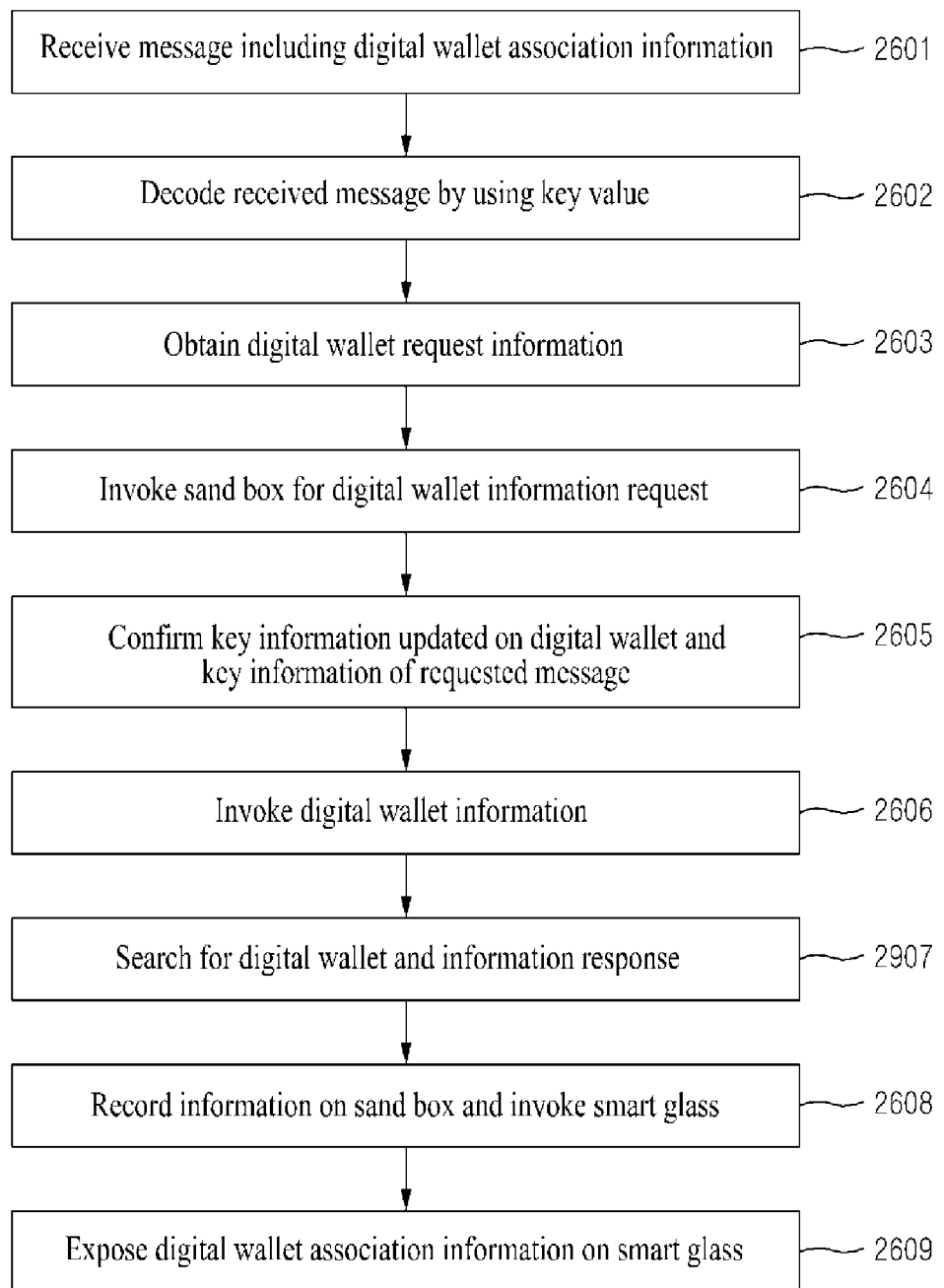

METHOD AND SYSTEM FOR IMPLEMENTING PLATFORM FOR PROVIDING OFFLINE INFORMATION TO SMART GLASS

CROSS-REFERENCE TO RELATED APPLICATIONS

This application is a continuation of U.S. application Ser. No. 18/087,986, filed on Dec. 23, 2022, entitled METHOD AND SYSTEM FOR IMPLEMENTING PLATFORM FOR PROVIDING OFFLINE INFORMATION TO SMART GLASS, which in turn is a continuation of U.S. application Ser. No. 17/846,451, filed on Jun. 22, 2022, now U.S. Pat. No. 11,567,319, which in turn is based on and claims priority under 35 U.S.C. § 119 to Korean Patent Application No. 10-2021-0132307, filed on Oct. 6, 2021, Korean Patent Application No. 10-2022-0048705, filed on Apr. 20, 2022, Korean Patent Application No. 10-2022-0048706, filed on Apr. 20, 2022, and Korean Patent Application No. 10-2022-0048707, filed on Apr. 20, 2022, the disclosures of which are herein incorporated by reference in their entireties for all purposes.

TECHNICAL FIELD

The following description relates to a technology for providing offline information to a smart device.

BACKGROUND OF THE DISCLOSURE

The supplying of various smart devices is increased. The production of smart glass based on virtual reality and augmented reality is imminent, the development of the smart glass is accelerated even in various development companies. The smart glass can identify a target interested by a user by using a location of a user in the real world, information on a line of sight of the user, etc. in a level that does not obstruct the line of sight, and can provide additional information.

If various types of information can be provided in a level that does not obstruct a user, it is expected that a decisive role can be provided in a determination, such as the consumption of a user. Business that requires a user's interests, such as related offline retail, will attempt to provide a user with its service through such an information provision function.

Accordingly, with the appearance of a service provider having a function that provides information to a smart device of a user offline, it is expected that platformization for delivering information to the smart device with the smart device will be possible.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

With the appearance of a smart device, an information broadcasting device (IBD), an information server, and a platform service provider that provides various functions including cost management, a new platform can be implemented on the basis of smart glass just as the app store could be provided.

In various embodiments, a computer device for implementing an information platform may include an information manager configured to manage service information to be exposed on smart glass based on service configuration information to be broadcasted through an information broadcasting device (IBD) registered by an information owner, and a content manager configured to distribute content, generated based on the managed service information, in a format configured in the smart glass.

The information manager may register, through the IBD, the service configuration information of the information owner related to online or offline information to be exposed on the smart glass by using an information management portal.

The information manager may configure, based on the registered service configuration information, a campaign including an information exposure form or the information exposure cycle with respect to the service information to be exposed on the smart glass.

The information manager may identify a target information delivery target based on data analysis through an external system by using a payment system previously installed in an offline store, and may associate the issue of a point or a coupon with the identified target information delivery target.

The information manager may upload content including text, an audio, an image, a video, or a URL generated with respect to the service information, may perform, on the uploaded content, an examination including quality, a size, privacy, and a policy, and may manage the content on which the examination has been performed.

The information manager may manage the IBD by providing connectivity and a health check function of the IBD through a device management system.

The information manager may generate a key based on a key management policy of the IBD through a device management system, and may provide key updates between the IBD and the smart glass by providing a key management function for the IBD.

The information manager may associate additional devices including point-of-sale (PoS) of a retail store and the IBD of the retail store for the managed service information through a device management system.

When multiple pieces of content for the managed service information need to be exposed, the information manager may execute biding based on a preconfigured rule through a bidding system, and may expose, on the smart glass, content finally won through the executed bidding.

The information manager may process the payment of a payment request from a user through a payment management system when content generated based on the service information broadcasted by the IBD is exposed.

When an external URL is invoked by a response from a user or service logic in relation to content exposed on the smart glass, the information manager may perform, on an information gateway, monitoring and billing of traffic performed in the smart glass based on the request and the response.

The information manager may connect the smart glass and the IBD through a service control system with respect to services of a service app store.

In various embodiments, a method of implementing an information platform, which is performed by a computer device, may include managing service information to be exposed on smart glass based on service configuration information to be broadcasted through an information broadcasting device (IBD) registered by an information owner, and distributing content, generated based on the managed service information, in a format configured in the smart glass.

In various embodiments, an information broadcasting device (IBD) for broadcasting information to smart glass through an information platform may include at least one processor configured to execute computer-readable instructions included in a memory. The at least one processor may determine location information between devices based on output signal change information with another information broadcasting device present near the information broadcasting device, and may broadcast, to the smart device, service configuration information registered by an information owner based on output intensity and a broadcasting cycle determined based on the determined location information.

When location information between devices is confirmed based on search frequency information of other information broadcasting devices present around the information broadcasting device from a device management system and the location information between the devices is within a preset distance, the at least one processor may receive an output signal change value between the devices, and may determine location information between the devices based on the received output signal change value between the devices.

The at least one processor may determine output intensity and a cycle of information broadcasting between the devices based on information and a policy registered with the device management system.

Various types of information can be provided to smart glass through a new platform that connects an information owner for providing a user of the smart glass with offline information and the user of the smart glass.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 13 is a diagram for describing a method of representing information on smart glass in an embodiment.

FIG. 14 is a diagrams for describing a method of representing information on smart glass in an embodiment.

FIG. 26 is a diagram for describing a digital wallet association operation of a user in an embodiment.

DETAILED DESCRIPTION

While illustrative embodiments have been illustrated and described, it will be appreciated that various changes can be made therein without departing from the spirit and scope of the disclosure.

Hereinafter, embodiments are described in detail with reference to the accompanying drawings.

Figure 1:
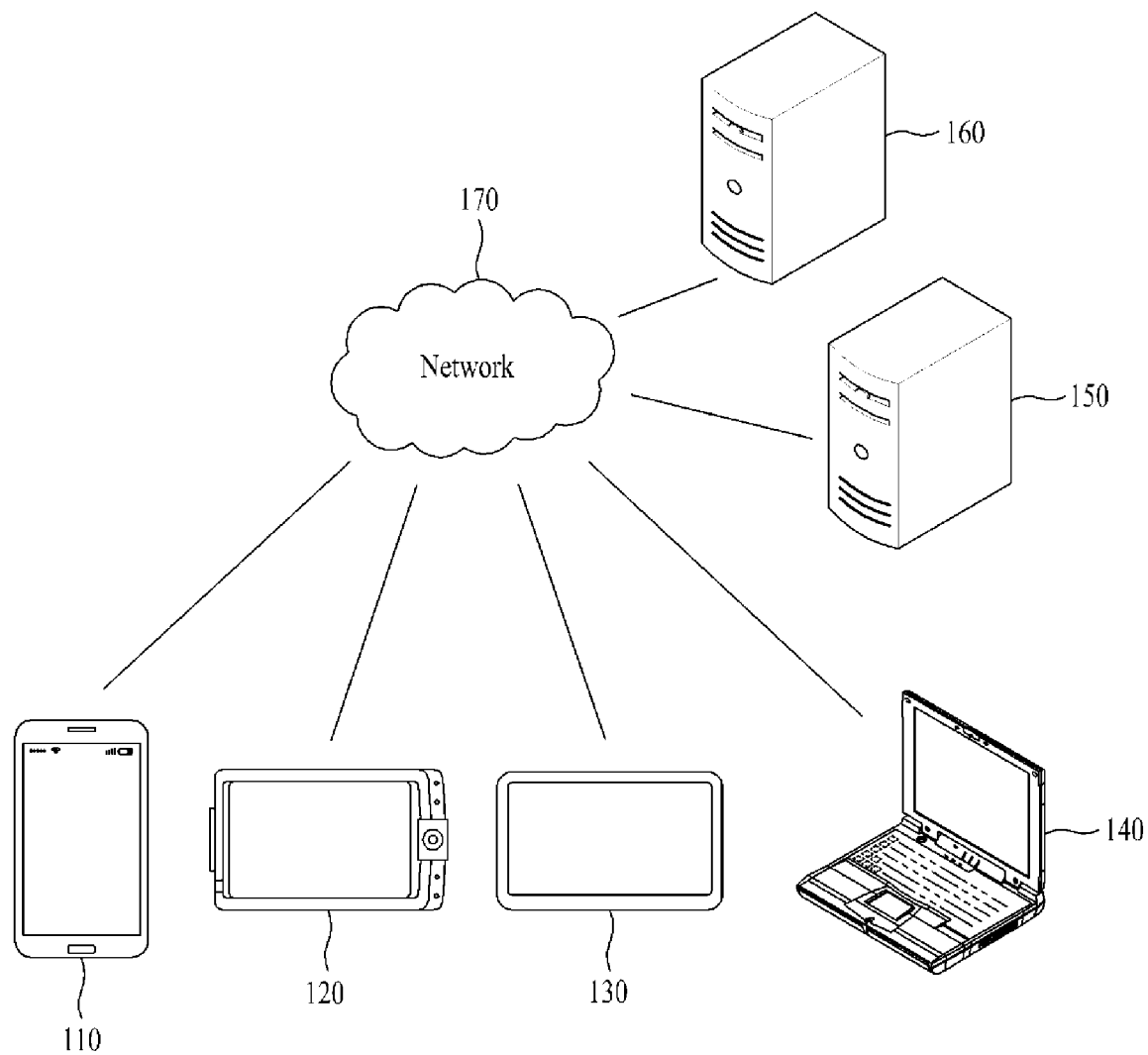
FIG. 1 is a diagram illustrating an example of a network environment according to an embodiment.

FIG. 1 is a diagram illustrating an example of a network environment according to an embodiment.

The network environment of FIG. 1 illustrates an example including a plurality of electronic devices 110, 120, 130, and 140, a plurality of servers 150 and 160, and a network 170. FIG. 1 is an example for describing the present disclosure, and the number of electronic devices or the number of servers is not limited to that of FIG. 1. Furthermore, the network environment of FIG. 1 merely describes one of environments applicable to the present embodiments, and an environment applicable to the present embodiments is not limited to the network environment of FIG. 1.

Each of the plurality of electronic devices 110, 120, 130 and 140 may be a stationary terminal or a mobile terminal implemented as a computer device. For example, the plurality of electronic devices 110, 120, 130 and 140 may include a smartphone, a mobile phone, a navigation device, a computer, a laptop computer, a device for digital broadcasting, personal digital assistants (PDA), a portable multimedia player (PMP), a tablet PC, etc. For example, in FIG. 1, a shape of a smartphone is illustrated as being an example of the electronic device 110. However, in embodiments of the present disclosure, the electronic device 110 may mean one of various physical computer devices capable of communicating with other electronic devices 120, 130 and 140 and/or the servers 150 and 160 over the network 170 substantially using a wireless or wired communication method.

The communication method is not limited, and may include short-distance wireless communication between devices in addition to communication methods using communication networks (e.g., a mobile communication network, wired Internet, wireless Internet, and a broadcasting network) which may be included in the network 170. For example, the network 170 may include one or more given networks of a personal area network (PAN), a local area network (LAN), a campus area network (CAN), a metropolitan area network (MAN), a wide area network (WAN), a broadband network (BBN), and the Internet. Furthermore, the network 170 may include one or more of network topologies, including a bus network, a star network, a ring network, a mesh network, a star-bus network, and a tree or hierarchical network, but is not limited thereto.

Each of the servers 150 and 160 may be implemented as a computer device or a plurality of computer devices, which provides an instruction, a code, a file, content, or a service through communication with the plurality of electronic devices 110, 120, 130 and 140 over the network 170. For example, the server 150 may be a system that provides the plurality of electronic devices 110, 120, 130, and 140 with a service (e.g., a content search service).

Figure 2:
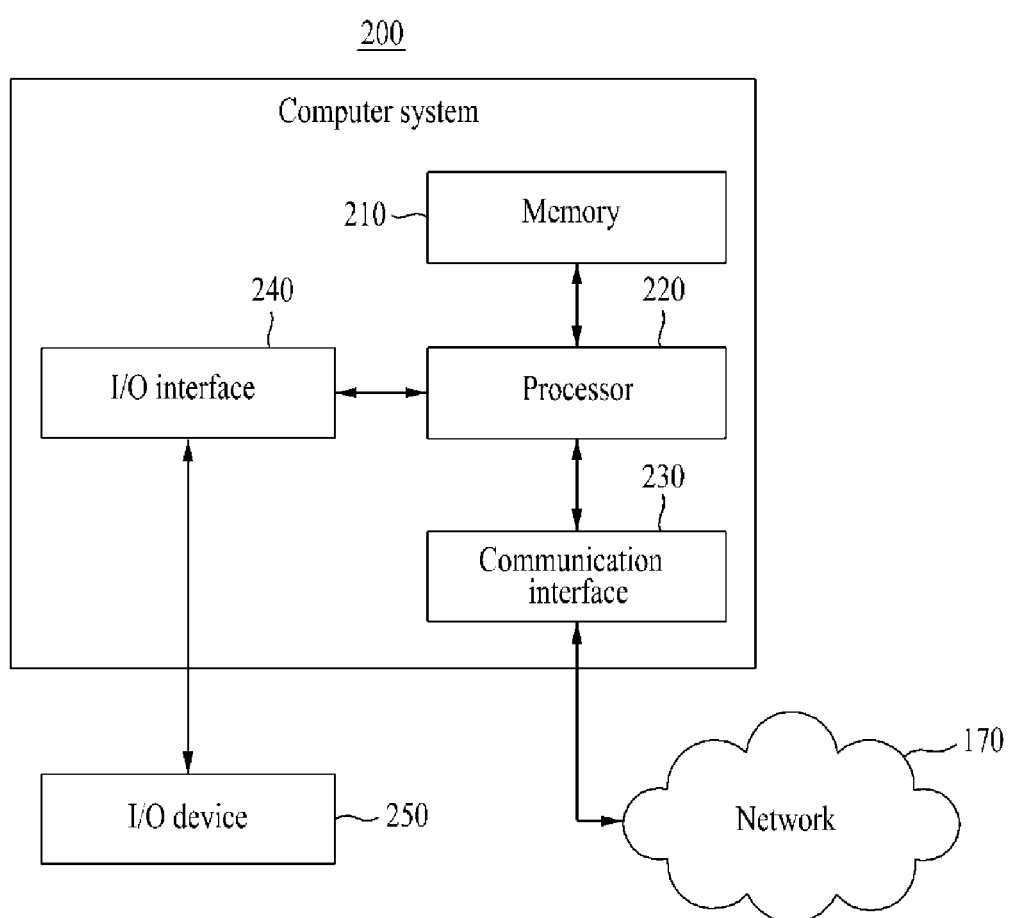
FIG. 2 is a block diagram illustrating an example of a computing device according to an embodiment of the present disclosure.

FIG. 2 is a block diagram illustrating an example of a computing device according to an embodiment of the present disclosure. Each of the plurality of electronic devices 110, 120, 130 and 140 or each of the servers 150 and 160 may be implemented as a computer device 200 illustrated in FIG. 2.

As illustrated in FIG. 2, the computer device 200 may include a memory 210, a processor 220, a communication interface 230 and an input/output (I/O) interface 240. The memory 210 is a computer-readable recording medium, and may include permanent mass storage devices, such as a random access memory (RAM), a read only memory (ROM) and a disk drive. In this case, the permanent mass storage device, such as a ROM and a disk drive, may be included in the computer device 200 as a permanent storage device separated from the memory 210. Furthermore, an operating system and at least one program code may be stored in the memory 210. Such software components may be loaded onto the memory 210 from a computer-readable recording medium separated from the memory 210. Such a separate computer-readable recording medium may include computer-readable recording media, such as a floppy drive, a disk, a tape, a DVD/CD-ROM drive, and a memory card. In another embodiment, software components may be loaded onto the memory 210 through the communication interface 230 not a computer-readable recording medium. For example, the software components may be loaded onto the memory 210 of the computer device 200 based on a computer program installed by files received over the network 170.

The processor 220 may be configured to process instructions of a computer program by performing basic arithmetic, logic and input/output (I/O) operations. The instructions may be provided to the processor 220 by the memory 210 or the communication interface 230. For example, the processor 220 may be configured to execute received instructions based on a program code stored in a recording device, such as the memory 210.

The communication interface 230 may provide a function for enabling the computer device 200 to communicate with other devices (e.g., the aforementioned storage devices) over the network 170. For example, a request, a command, data or a file generated by the processor 220 of the computer device 200 based on a program code stored in a recording device, such as the memory 210, may be provided to other devices over the network 170 under the control of the communication interface 230. Inversely, a signal, a command, data or a file from another device may be received by the computer device 200 through the communication interface 230 of the computer device 200 over the network 170. A signal, a command or a file received through the communication interface 230 may be transmitted to the processor 220 or the memory 210. A file received through the communication interface 230 may be stored in a storage device (e.g., the aforementioned permanent storage device) which may be further included in the computer device 200.

The I/O interface 240 may be means for an interface with an I/O device 250. For example, the input device may include a device, such as a microphone, a keyboard, or a mouse. The output device may include a device, such as a display or a speaker. Furthermore, for example, the I/O interface 240 may be means for an interface with a device in which functions for input and output have been integrated into one, such as a touch screen. At least one of the I/O devices 250, together with the computer device 200, may be configured as a single device.

Furthermore, in other embodiments, the computer device 200 may include components greater or smaller than the components of FIG. 2. However, it is not necessary to clearly illustrate most of conventional components. For example, the computer device 200 may be implemented to include at least some of the I/O devices 250 or may further include other components, such as a transceiver and a database.

Figure 3:
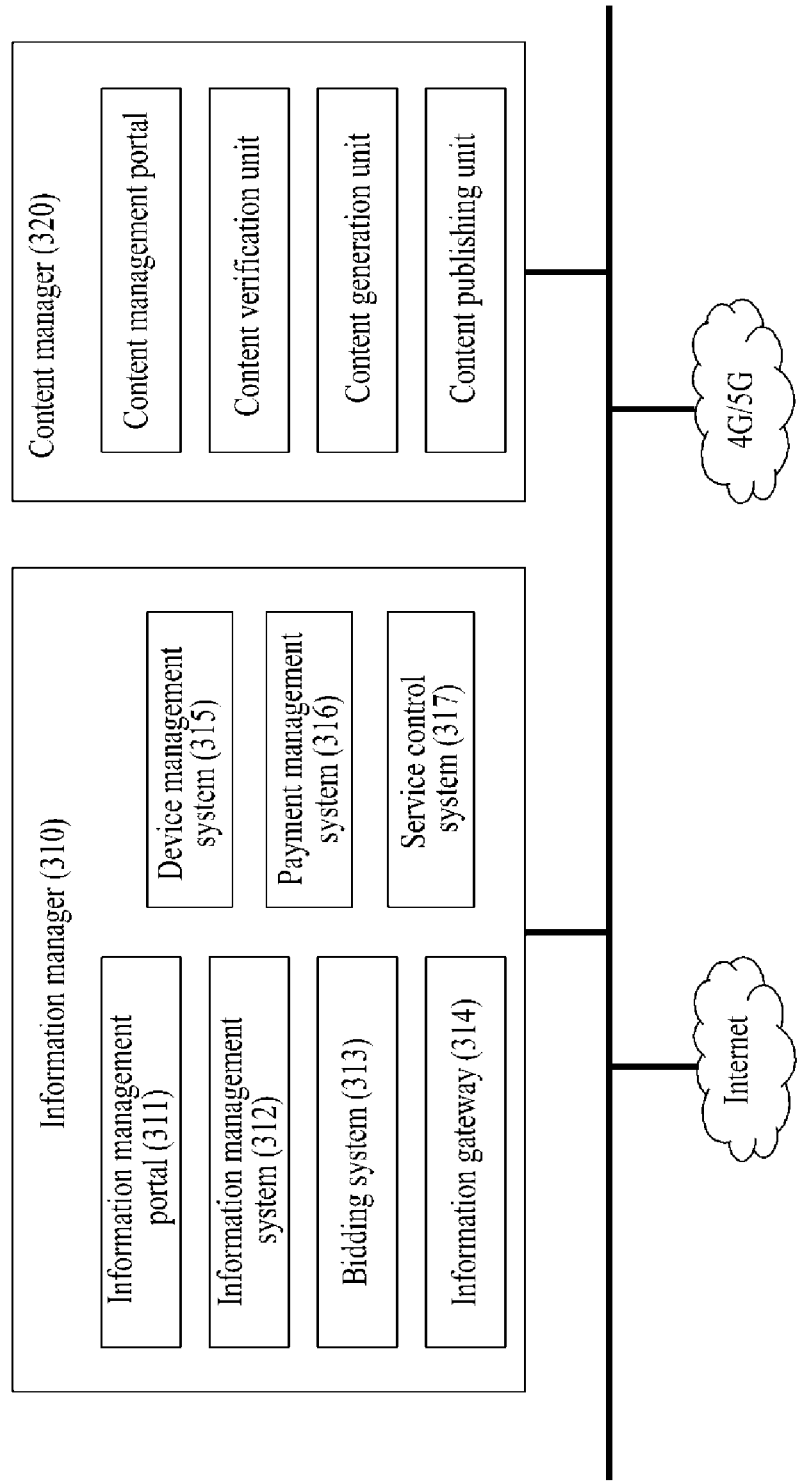
FIG. 3 is a diagram for describing a structure of a computer device for a platform implementation according to an embodiment.

FIG. 3 is a diagram for describing a structure of a computer device for a platform implementation according to an embodiment.

The computer device 200 may include an information manager 310 and a content manager 320. A platform from a viewpoint of a user device, an information broadcasting device (IBD), and an information server, and a platform service provider that provides a cost management function may be implemented through the computer device 200.

The information manager 310 may manage service information to be exposed on smart glass based on service configuration information to be broadcasted through a registered IBD from an information owner. The information manager 310 may include an information management portal 311, an information management system 312, a bidding system 313, an information gateway 314, a device management system 315, a payment management system 316, and a service control system 317.

Figure 4:
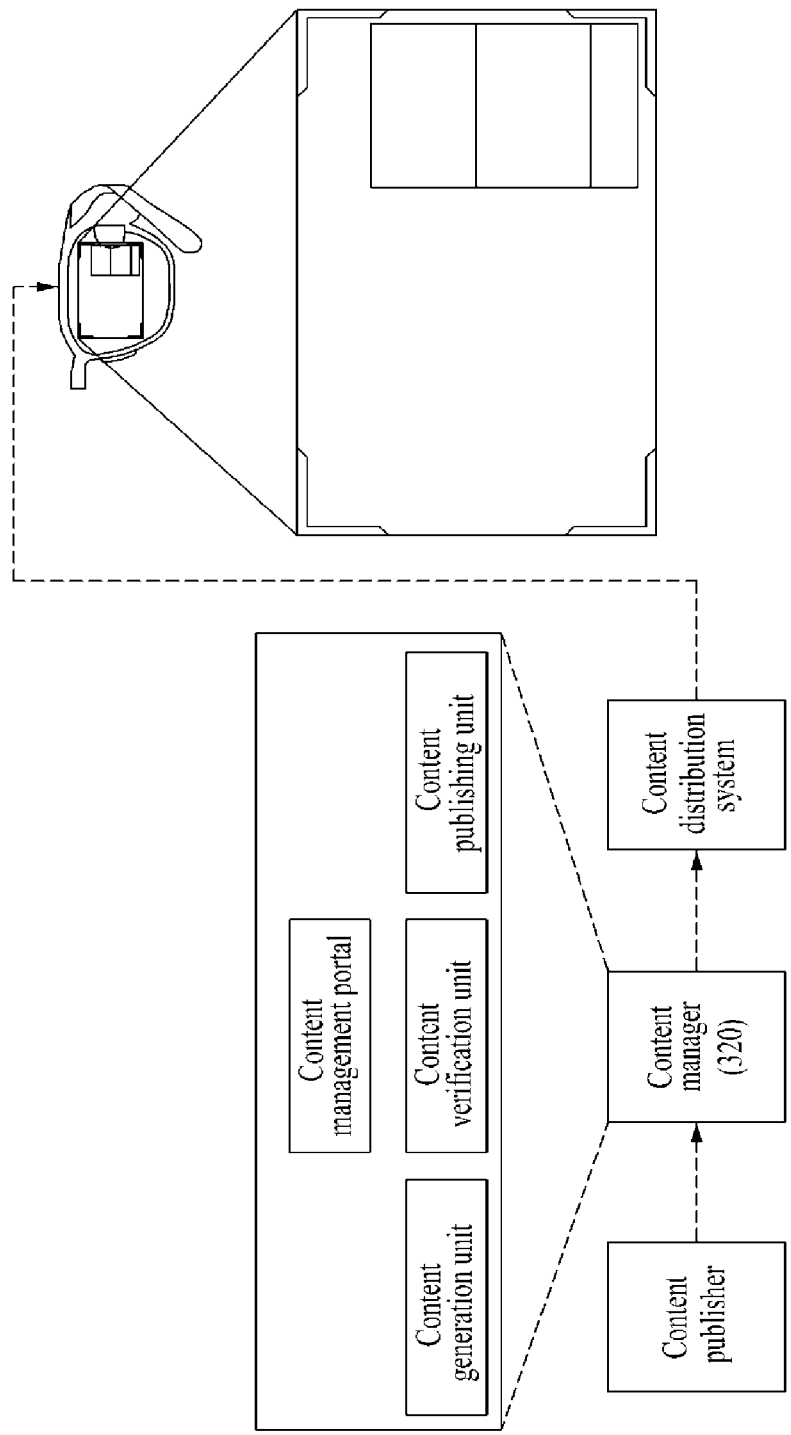
FIG. 4 is a diagram for describing architecture of a content manager in an embodiment.

The content manager 320 may distribute content generated by using managed service information based on a format configured in smart glass. The content manager 320 may include a content management portal that provides content management portal services, a content verification unit that verifies content, a content generation unit that generates content, and a content publishing unit that publishes content. FIG. 4 is a diagram for describing architecture of the content manager in an embodiment. When information is provided to smart glass, the information may be provided according to a determined format in order to facilitate content consumption even through a limited interaction without being obstructed by a line of sight of a user. Content may be created and managed by using a separate dedicated content management system (CMS) of a smart glass supplier or content may be written based on a guide, and the created or written content may be examined and then provided to the smart glass.

The information management portal 311 is a portal service for controlling offline information exposed on smart glass. If an offline or online information owner attempts to deliver information through an information broadcasting device (IBD) capable of delivering information on smart glass, the information may be provided by using a portal service provided by the information management portal. For example, an offline retail store owner or an IBD owner may access the information management portal, and may perform various configurations related to information that the owner attempts to expose the information on smart glass.

Figure 5:
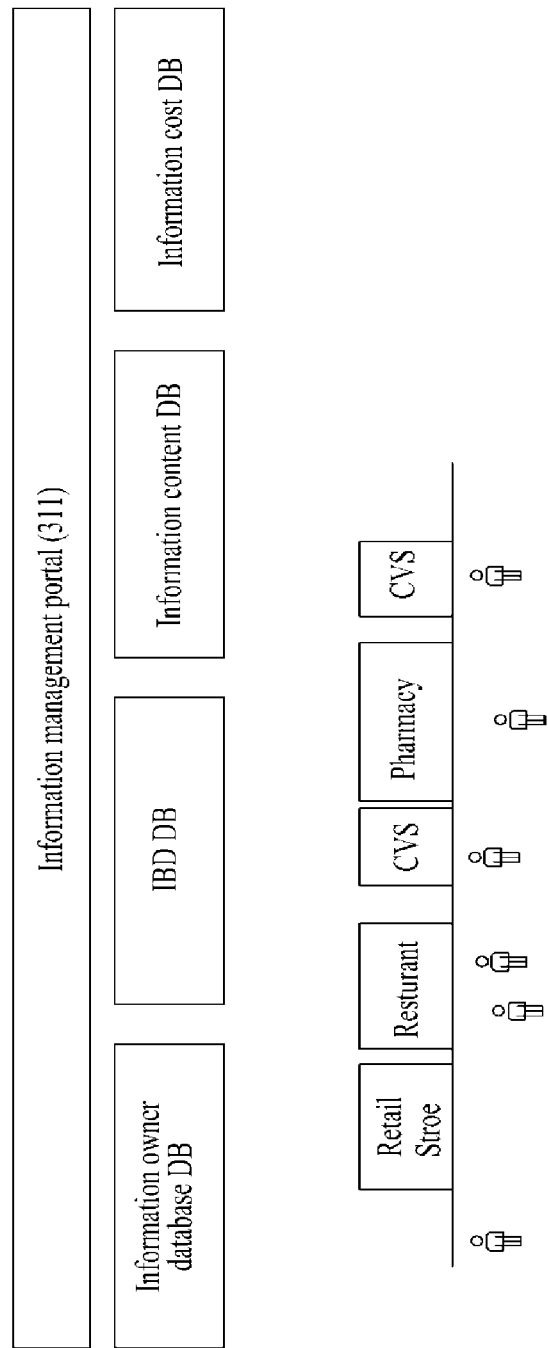
FIG. 5 is a diagram for describing an operation of an information management portal in an embodiment.

Referring to FIG. 5, the information management portal 311 may include an information owner database (DB), an IBD DB, an information content DB, and an information cost DB. The information owner DB may manage the registration, modification, and deletion of information related to an information owner. The IBD DB may perform authentication and release management of an IBD, the health check of an IBD, and the broadcasting signal management of an IBD. The information content DB may perform information contents management, information cycle management, and information connection information management. The information cost DB may perform information cost management (based on a location), cost management based on an information exposure cycle, and customized recommendation information cost management (based on user characteristic association).

The information management system 312 may provide a configuration related to actual information exposure and a content management function. The information management system may configure a campaign for information exposure. The information management system may provide the campaign configuration function on the basis of a user information exposure point. In this case, the campaign means a unit in which an information exposure form, a cycle, etc. may be configured. The information management system 312 may identify a data analysis-based customized target information delivery target through an external system in association with a payment system that has been previously installed in an offline store. The information management system 312 may associate the issuing of a point or a coupon of a user through an information delivery target. Furthermore, the information management system 312 may manage information content. The information management system 312 may provide a function for uploading and managing content (e.g., text, an audio, an image (icon), a video, or a URL) to be exposed on smart glass. The information management system 312 may perform a basic examination (e.g., quality, a size, privacy, or a policy) into information content uploaded by a user.

The device management system 315 may provide a management function of a retail IBD. For example, the device management system 315 may provide functions, such as the connectivity and health check of an IBD.

Furthermore, the device management system 315 may provide a key management function for the IBD of a retail store. The device management system 315 may generate a key generation rule based on a key management policy of a platform, and may generate a key according to the generated key generation rule. The platform may maintain security by providing key updates between smart glass and an IBD. Related key information may include a key expiration time.

Furthermore, the device management system 315 may associate an additional device, such as retail point-of-sale (POS). The device management system 315 may provide a function capable of associating and controlling devices capable of services in association with an IBD. For example, the device management system 315 may provide point-of-sale (PoS), queue management, table management, etc.

Figure 6:
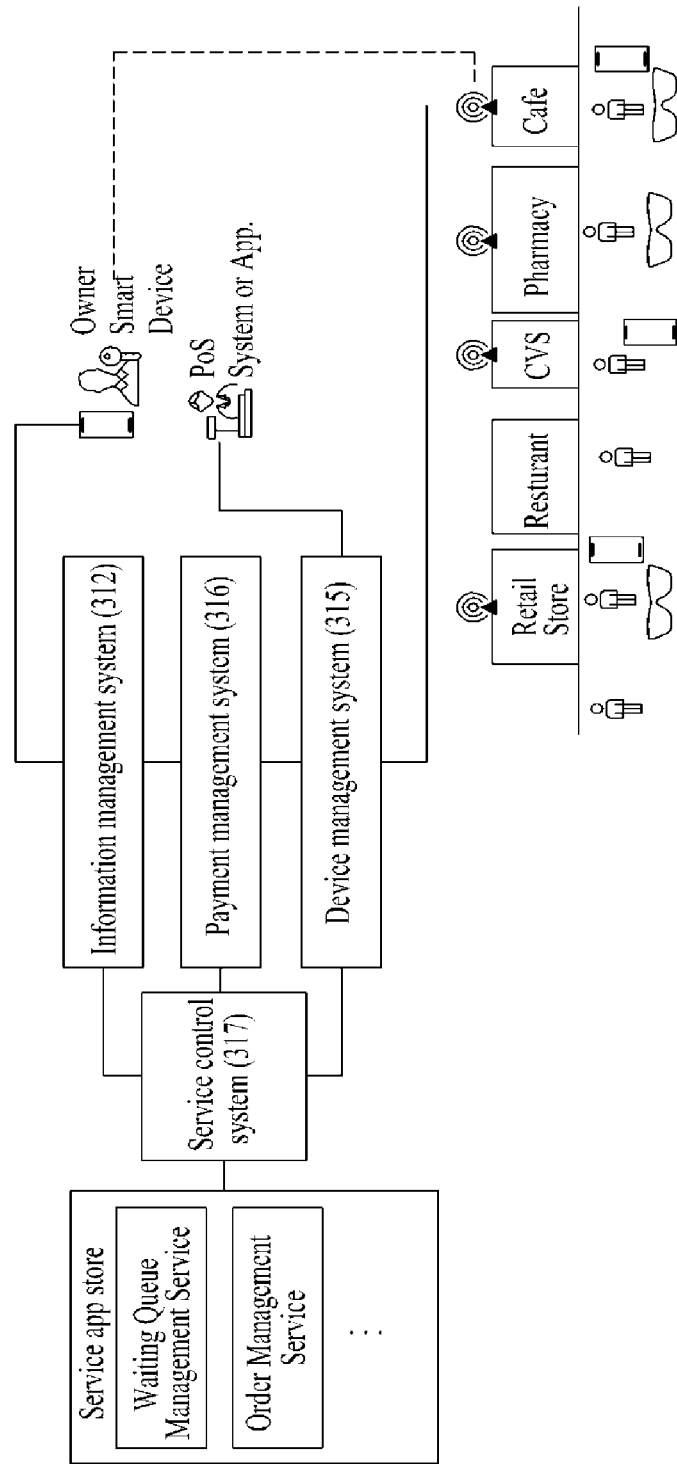
FIG. 6 is a diagram for describing a device management operation in an embodiment.

FIG. 6 is a diagram for describing a device management operation in an embodiment. A service app store may provide various services, such as a waiting management service and an order management service. A service provided through the service app store may be executed by the service control system 317 in a device of an information owner and PoS through the information management system 312, the payment management system 316, and the device management system 315. The device management system 315 may provide a function for managing the IBD of a retail store. The device management system 315 may manage the connectivity and health check of an IBD in a retail store, key management, and an additional association device such as PoS.

The bidding system 313 may provide a bidding function if multiple content exposures need to be performed upon information exposure. The bidding system 313 may expose, to a user, content that has finally won bidding after the bidding according to a preconfigured rule.

The payment management system 316 may process payment if the payment through smart glass and an IBD is performed, and may perform roles of the existing payment system and gateway.

If an external URL, etc. is invoked by a response from a user or service logic, the information gateway 314 may perform monitoring and a billing task for traffic which are performed on smart glass of a user or a user device through a request and response for the gateway.

The service control system 317 may control association with external services. The service control system 317 may perform a traffic routing function, and may provide related authentication, logging, etc. All services of a service app store may be connected to a smart device and IBD of a user through only the service control system 317.

Figure 7:
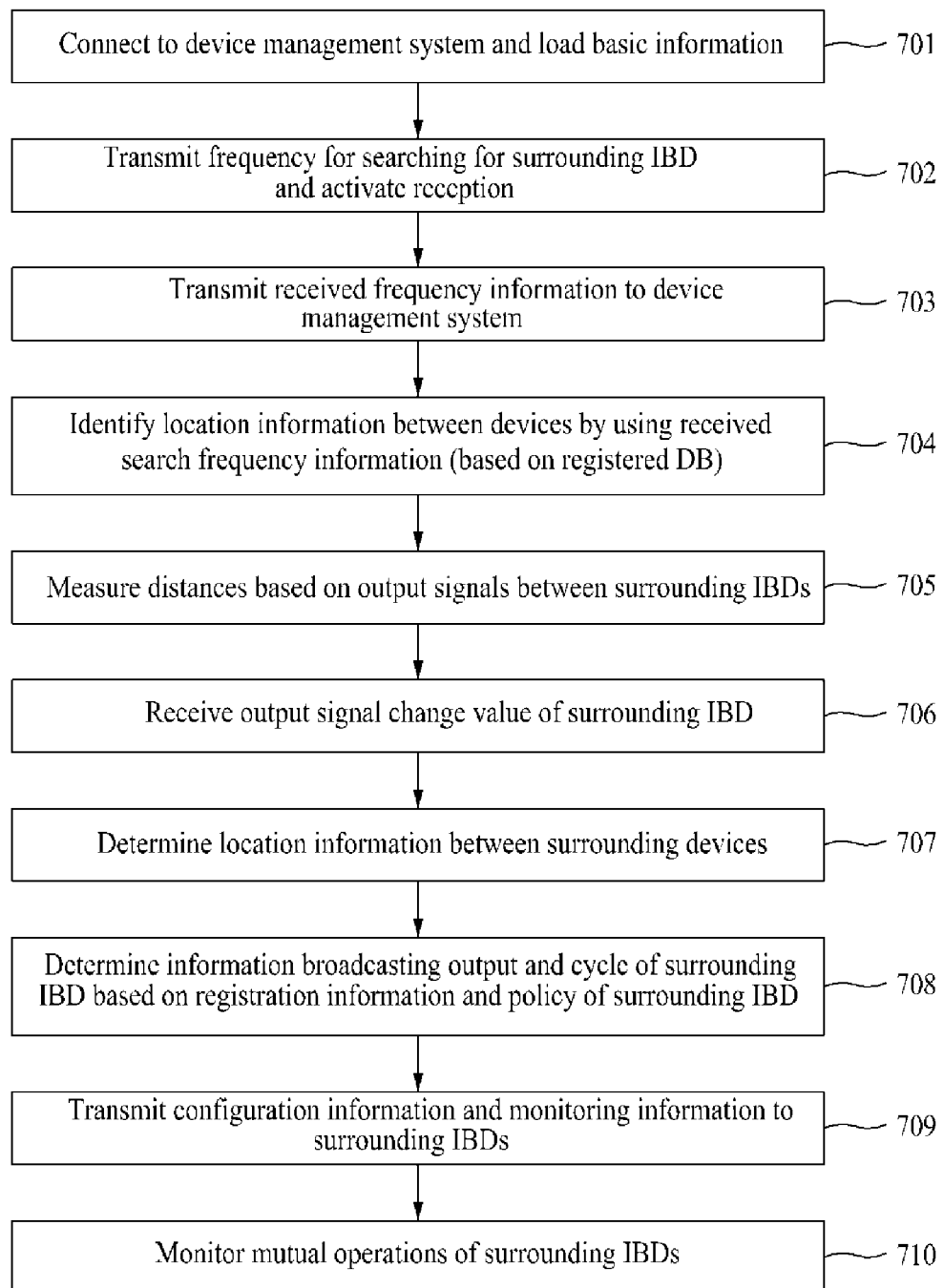
FIG. 7 is a flowchart for describing an operation of an information broadcasting device (IBD) in an embodiment.

FIG. 7 is a flowchart for describing an operation of an information broadcasting device (IBD) in an embodiment.

The IBD is a device for broadcasting, to a smart device (e.g., smart glass), a radio signal for information in a retail store. The IBD may wirelessly broadcast information to the smart device of a user through an Internet connection function. The IBD may be configured as an individual device in a retail store. Multiple devices not one device may be configured as one group depending on signal intensity and the size of a retail store. For example, an IBD may be configured in each retail store, or a plurality of IBDs may be configured in one retail store, or one IBD responsible for a plurality of retail stores may be configured in a plurality of retail stores.

A communication method of the IBD may be associated with Ethernet for an Internet connection, WiFi, Bluetooth (BLE), cellular, and other various wireless methods. A communication characteristic of the IBD is that it provides a control function through a device management system without directly providing a control function, and provides functions, such as the recognition of a surrounding device and the adjustment of a data broadcasting cycle.

If the IBD is used in a sizeable retail store, the IBD may be differently configured depending on the size of a retail store, an internal and external connection, and a service function. For example, if a space is equal to or greater than a preset criterion, two or more IBDs may be configured or may be installed outside a building, such as in front of a retail store and a parking lot of a retail store.

The IBD may be basically controlled through the device management system that provides the IBD, and may be controlled through a device of a terminal owner. An external device or a service to which the IBD is connected is essentially performed through a system of a supplier. Accordingly, an additional service through control, recording, etc. can be provided.

In step 701, the IBD may connect to the device management system (or server) and load basic information. When a device is newly registered with the device management system, an authentication task may be performed. The authentication task may be performed through authentication with an information owner of a retail store. As the authentication task with the information owner of the retail store is completed, whether other IBDs registered with the device management system are present in a surrounding area in which the corresponding retail store is located. If it is determined that an IBD is located in the surrounding area, a procedure for updating a configuration with the IBD may be performed. In this case, when the IBD is newly registered, if other IBDs are present around the IBD, temporary ID values may be generated for each IBD in order to distinguish between other IBDs when broadcasting information for search, and a search operation may be indicated with respect to the surrounding IBDs.

In step 702, when registering the IBD, the device management system may activate a function for transmitting and receiving search frequencies of surrounding IBDs. The device management system may adjust whether surrounding IBDs are present and signal strength. Accordingly, differentiated cost policies through the obstruction of a user, battery consumption, a limited opportunity of information exposure, etc. may be performed by managing a smart device of a user so that the smart device does not too much information in a specific area.

In step 703, the IBD may transmit the received frequency information to the device management system. In this case, in addition to the newly registered IBD, surrounding IBDs that receive the search information may also deliver the received frequency information to the device management system.

In step 704, the device management system may identify location information between the IBDs by using the received search frequency information. The device management system may generate location information of the surrounding IBDs by using the received search frequency information. In this case, the location information of the IBD along with location information (addresses) registered with the device management system may be configured.

In step 705, the device management system may measure distances based on output signals between the surrounding IBDs. If IBDs are adjacent to each other, the device management system may measure a physical distance by adjusting output signals between the adjacent IBDs. In this case, physical distances between the IBDs may be configured based on information, such as the intensity, reception, response time, etc. of a frequency, by using a smart device of a user in addition to the IBDs. In this case, if the IBDs have been installed in two neighboring retail stores and are partitioned by a wall, responses to configuration situations may be additionally obtained from owners of the IBDs.

In step 706, the device management system may receive an output signal change value of a surrounding IBD. The device management system may receive signal values broadcasted by surrounding IBDs that have received a signal-based distance measurement request for a given time. The device management system may identify whether a surrounding IBD is present, a distance and output intensity of a surrounding IBD, etc. based on the signal values.

In step 707, the device management system may determine location information between surrounding IBDs. The device management system may determine locations based on the signal intensity and the number of surrounding IBDs, etc.

In step 708, the device management system may determine information broadcasting output and cycle of a surrounding IBD, based on registration information and a policy of a surrounding IBD. The device management system may adjust output intensity of an individual IBD, based on information registration of a surrounding IBD, a policy of a platform service provider, and a location characteristic of an individual IBD. Furthermore, the device management system may determine a cycle in which mutual information will be broadcasted depending on whether a surrounding IBD is present.

In step 709, the device management system may transmit the configuration information (e.g., output intensity and a cycle) and the monitoring information to surrounding IBDs. In step 710, the device management system may monitor mutual operations of surrounding IBDs.

Figure 8:
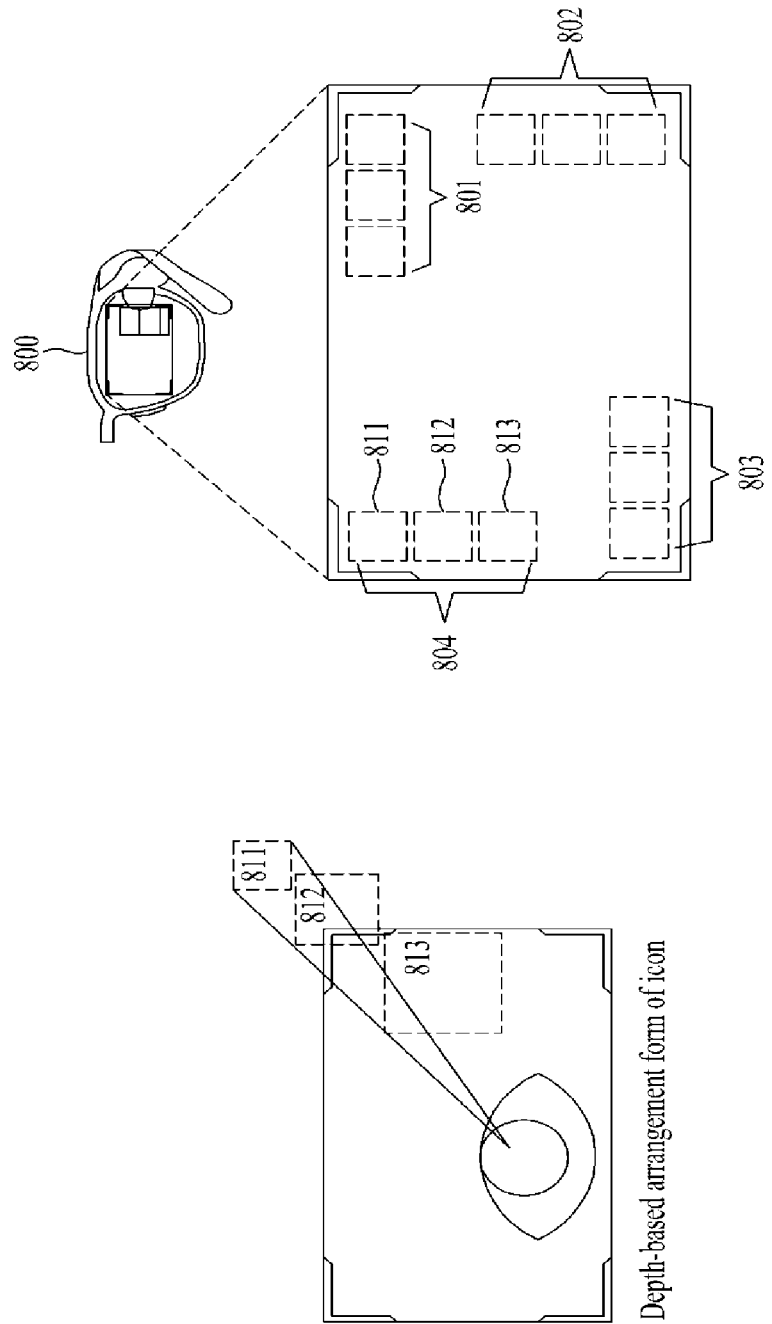
FIG. 8 is a example for describing an operation of representing information on a screen of smart glass in an embodiment.

FIG. 8 is an example for describing an operation of representing information on a screen of smart glass in an embodiment.

The smart glass may be a device which may be worn on a part of the body of a user. Information may be exposed through a display (or a screen) of such smart glass. Results corresponding to the exposed information may be provided through the display in response to a user input (e.g., a touch).

A space for exposing the information on the smart glass may be configured at a location that does not obstructs a line of sight of a user. A location where information is exposed may be adjusted depending on user convenience.

Spaces for exposing information on smart glass may be arranged in a horizontal or vertical form on the basis of corners of a display, respectively, as in 801, 802, 803, and 804. One or more exposure areas 811, 812, and 813 may be configured in each space for exposing information. Each exposure area may include a basic area and additional information area based on a configuration of a user.

The space for exposing information on the smart glass may be divided based on any one of supplier-based control, priority of information, or a configuration of a user. In this case, each of the one or more exposure areas 811, 812, and 813 divided based on the space for exposing information may be configured based on its priority.

Figure 9:
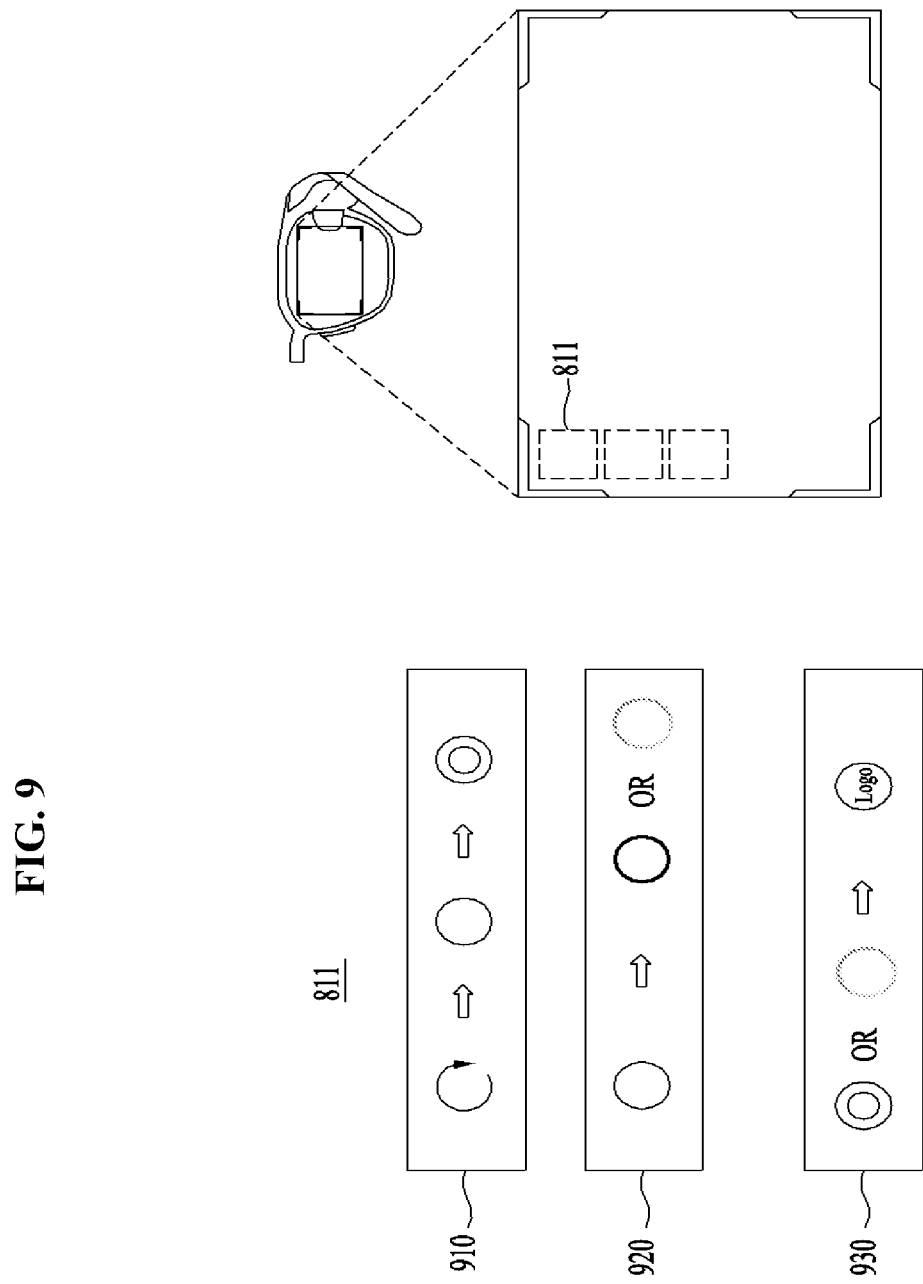
FIG. 9 is a example for describing an operation of representing information on a screen of smart glass in an embodiment.

Referring to FIG. 9, information for identifying a recognition target in smart glass may be exposed. A location (i.e., an edge or corner) of a first exposure area 911 divided in a space for exposing information in the smart glass is a location where information for identifying a recognition target is exposed. The location plays a role in indicating the source or target of information provided to a user, and may have a basic value. In general, a logo, an icon, a business name, or a category delimiter (e.g., an icon or text) may be placed in the location. The first exposure area 811 plays a role in exposing recognized specific information to a user when the specific information is recognized through smart glass, and may be represented in an icon form so that the user can recognize a corresponding icon through the first exposure area 811.

For example, FIG. 9 is an example of a representation of an icon provided to the first exposure area 811 by a system (e.g., an information owner or a platform supplier). This means that information recognized nearby is present in the smart glass.

As in 910, in a recognition step, the recognition of a user who has worn smart glass may be helped through a stepwise change of the icon depending on a recognition level. Alternatively, as in 920, when the recognition of a user is completed in the state in which the color of an icon is blurred, the recognition of a user may be helped through bold or color.

Furthermore, as in 930, when the recognition of a user is completed or when a message is received from an IBD of a corresponding company (e.g., a retail store), the recognition of a user may be helped by substituting related information with a logo of the company instead of an icon. In this case, the logo information may be separately received through the IBD of the retail store or may be loaded based on a URL.

Figure 10:
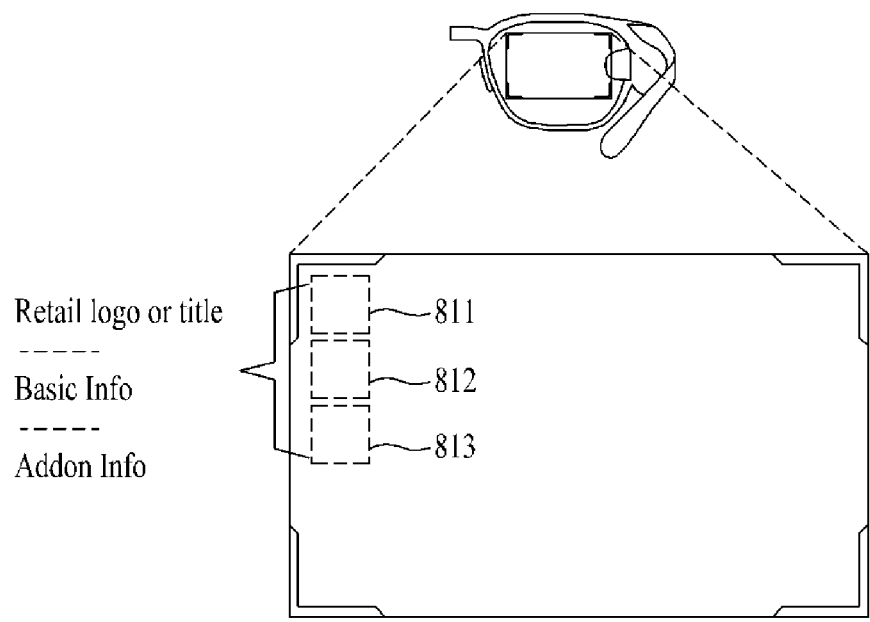
FIG. 10 is a example for describing an operation of representing information on a screen of smart glass in an embodiment.

Referring to FIG. 10, basic information and additional information may be exposed on smart glass. A location of the second exposure area 812 divided in the space for exposing information in the smart glass is an area where representative information of basically recognized information is provided. Basic information provided by a target recognized in the second exposure area 812 is received by a platform or an IBD disposed in a retail store and then provided to the smart glass. Basic information to be exposed to a user by an owner of a corresponding space may be configured at the location of the second exposure area 812. The owner of the corresponding space may expose information when the corresponding information is registered with an information management platform.

A location of the third exposure area 813 divided in the space for exposing information in the smart glass is an area where additional information of basically recognized information is provided and is an area for information to be additionally exposed by a supplier of a recognized target. For the exposure of information of the third exposure area 813, separate additional information may be configured and a cost therefor may be paid.

Exposure target information of smart glass may be configured. In this case, the exposure target information may be controlled based on any one or one or more of a configuration of a user, basic contents (e.g., category) provided by an information platform, or user (e.g., smart watch) association information of a smart device. For example, information configured by a user, such as additional information, may be controlled. Furthermore, in the case of a category, basic information (e.g., business classification or a service type of a retail store or map association information) recognized in smart glass may be configured as a value configured by a system supplier. A user may turn on/off an exposure target for basic information for each category or each service subject. Furthermore, exposure target information may be determined in association with information on each app, credit card, etc. which is installed in a smart device of a user, based on received information. For example, if a specific credit card has been registered with a digital wallet, discount information of the credit card may be associated and provided upon alarm or at payment timing at which the digital wallet is used. For example, if an app related to a specific store has been installed, exposure target information may be configured in association with information on the specific store upon information exposure.

Figure 11:
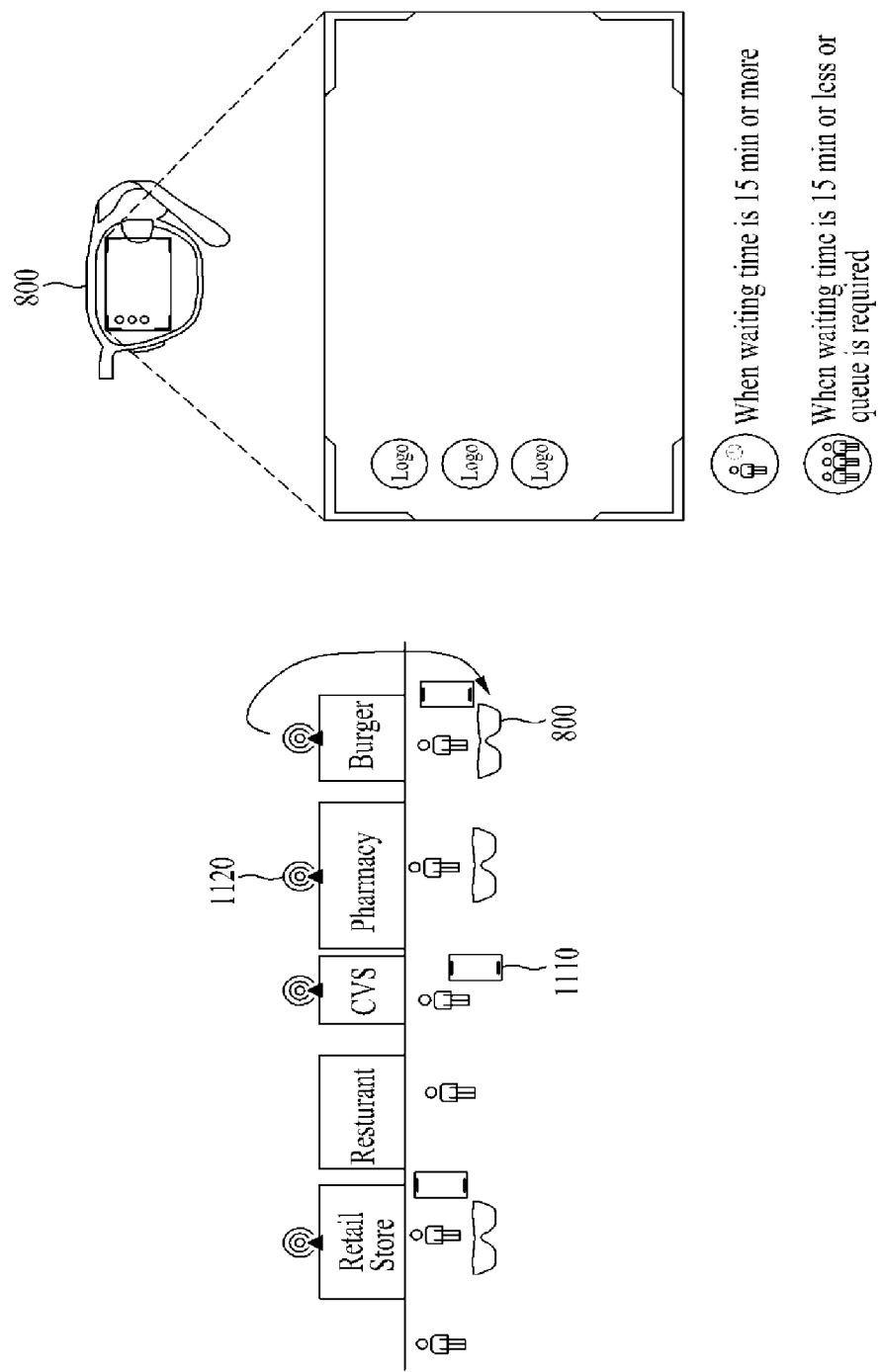
FIG. 11 is a example for describing an operation of representing information on a screen of smart glass in an embodiment.

Referring to FIG. 11, if an app store side exposes various types of information to a smart device of a user, confusion attributable to the excess of information and a user intervention may occur. Accordingly, the least required information needs to be transmitted.

An information list which may be provided to a smart device (e.g., a user device 1110 or smart glass 800) through an IBD 1120 of a retail store on an information platform may be guided. A user may select information to be displayed through the information list by using the smart device 1110 or 800. For example, 1) whether a store is open, 2) queue state entrance, waiting situation information related to orders or payment, 3) a waiting queue registration function, 4) a sale/discount and coupon discount information provision and confirmation function, 5) new item or new product information, 6) URL-external link information, etc. may be guided. In this case, for the exposure of information related to the providable information list, a separate cost may occur from a standpoint of an information owner.

Furthermore, a degree of congestion information for an icon displayed on the smart glass 800 may be represented in order of green, yellow, and red. Furthermore, icons when a waiting time is equal to or greater than a preset time (e.g., 15 minutes) and a waiting time is equal to or smaller than a preset time (e.g., 15 minutes) may be differently represented.

Figure 12:
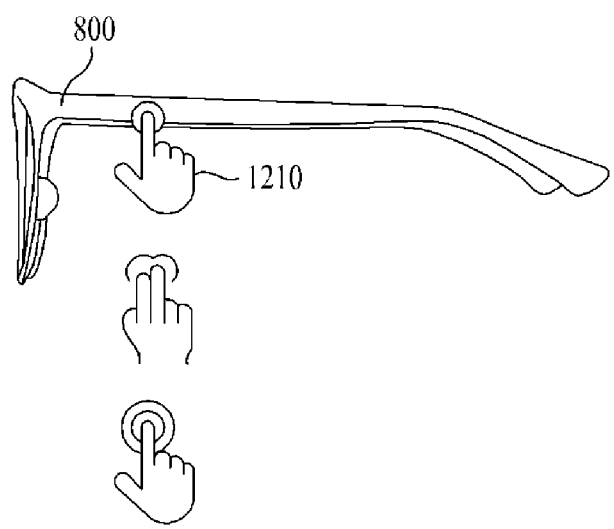
FIG. 12 is a diagram for describing an operation of providing information to smart glass and controlling information in an embodiment.

FIG. 12 is a diagram for describing an operation of providing information to smart glass and controlling information in an embodiment.

Information exposed on the smart glass 800 may be divided into basic information and additional information. In this case, the additional information may be exposed based on an input or request from a user.

The basic information is information that is basically exposed on the smart glass 800, and also has an object of minimizing obstruction of a line of sight of a user.

The additional information provides additional information (e.g., advertising) depending on a user interest based on response information based on a user input, and has an object of being provided with respect to only registered information according to a determined rule.

For example, a motion of a user inputted to or requested from the smart glass 800 is described. When the user inputs a one-tab gesture to a specific area of the smart glass 800 by using one finger 1210, a basic call signal may be generated. Accordingly, as the user is registered with a waiting queue, a state of the smart glass 800 may become a call waiting state. Alternatively, when a user inputs a one-tab gesture to a specific area of the smart glass by using two fingers 1210, an additional call signal may be generated. Accordingly, as related additional information for exposed additional information is requested, the additional information may be exposed on a display of the smart glass 800. Alternatively, when a long-tab gesture is inputted to a specific area of the smart glass 800 by using one finger 1210, a cancellation signal may be generated. Accordingly, the exposure of additional information may be cancelled in response to the requested signal.

More specifically, a user input method for the smart glass 800 is described. The smart glass 800 may be controlled through a user device which may be associated therewith in addition to a sensor of the smart glass 800. A user command may be inputted to the smart glass 800 through a tab based on a touch, a voice, association with a surrounding device, or a gesture. When a sensing portion of the smart glass 800 is tabbed, a corresponding input may be divided depending on the number, length, or direction of the tab. For example, a tab command "back and forth sweeping in any one of an eye direction or an ear direction" may be inputted. If the smart glass is to be controlled by a user's voice, the smart glass may be silently controlled in a humming level of a user in addition to a common voice command. In this case, with respect to the humming level, a recognition rate improvement function using vibration (or frequency) information of a portion of the smart glass with which the head of the user comes into contact in addition to a sound may be provided based on shaking information upon humming through a configuration for each user. In the case of association with a surrounding device, when the smart glass 800 is controlled by using a smart watch, the smart watch may be associated with an input function defined by a user through a tab, fist clenching, wrist shaking, wrist twisting, etc. Furthermore, when the smart glass 800 is controlled by using a smart phone, the smart glass 800 may rapidly switch into a control mode through a double tab even in the state in which the smart phone has been locked. A screen of the smart phone may be used in a touch pad form. In the case of a gesture, when the smart glass 800 is controlled by a motion of a body (e.g., the head or the neck) connected to the smart glass 800, the smart glass 800 may learn a recognizable level and associated with an input function defined by a user.

FIGS. 13 and 14 are diagrams for describing a method of representing information on smart glass in an embodiment.

Dissatisfaction (e.g., the difficulty of browsing) with the smart glass 800 may occur in terms of user experiences for common web content due to a special information exposure environment. Unnecessary information attributable to the advertising of the existing web content and an excessive color change, such as GIF animation, may cause user's inconvenience in using smart glass. In particular, in an environment in which a user interaction is difficult, it is difficult to use a scroll & hyperlink, etc. Accordingly, it is necessary to provide content suitable for an environment of the smart glass 800.

FIG. 13 is an example in which content having a card style form is used at a location where a line of sight of a user is not obstructed. It is essential to provide an optimal user interface (UI) capable of improving a user content use experience based on publishing through the processing of information customized for a smart glass environment. Separate refined content exposure not common online content browsing is essential. Accordingly, content may become well-formatted content through a publishing environment provided by a supplier of smart glass. A basic format for content exposure needs to follow a template format based on a card style in a level in which visual obstruction of a user is minimized. Content having a card style may need to be placed at a location required by a user within a range of a limited size so that a line of sight of the user is not obstructed. Such content having a card style may be adjusted within a limited range, such as a horizontal style card 1320 and a vertical style card 1310 (FIG. 13(A)). Control information may be specified on content exposed on smart glass. Whether a user input is required can be rapidly determined by specifying, in a metadata form, whether to control content based on a separate content management system or a guide presented in a platform in the smart glass. For example, if information is connected to another card (e.g., moving on to a next card or selecting one of several card and moving on to the selected card), when a user input is required (e.g., a text box a form), user control may be necessary.

When a plurality of (e.g., two or more) choices in which card style content exposed on smart glass moves on to a next card is present, smart glass may be controlled through a user input, such as sweeping forward, sweeping backward, or touching a left/right frame. A smart watch or a smart phone may be controlled through a user input, such as dragging a left/right touch (FIG. 13(B)). In this case, for the user input for control of a user, a command may be configured by the user, and user control may be performed in response to the configured command.

FIG. 14 illustrates an example in which a card style having a horizontal arrangement or a vertical arrangement is configured depending on user preference. When information is provided to the smart glass 800, content must be aligned within a corresponding area. When additional information is provided to the smart glass 800, a current card may move on to a next card in a next page or scroll may be selected. In this case, a moving method for information navigation of the smart glass 800 may be controlled by using a control method (e.g., pupil recognition, a gesture, a voice, humming, association with an external device (e.g., a phone or a watch)) of the smart glass 800.

Content is basically exposed at an outer area on the basis of a line of sight of a user. For example, in order to avoid obstruction of a line of sight, content may be exposed on the left of a screen when the content is exposed in the left eye of the smart glass 800 and may be exposed on the right of a screen when the content is exposed in the right eye of the smart glass 800. In this case, if content exposure timing is timing at which a user is moving or placed on the outside, content having a form in which a background is fully covered may be configured so that the content is not exposed.

Figure 15:
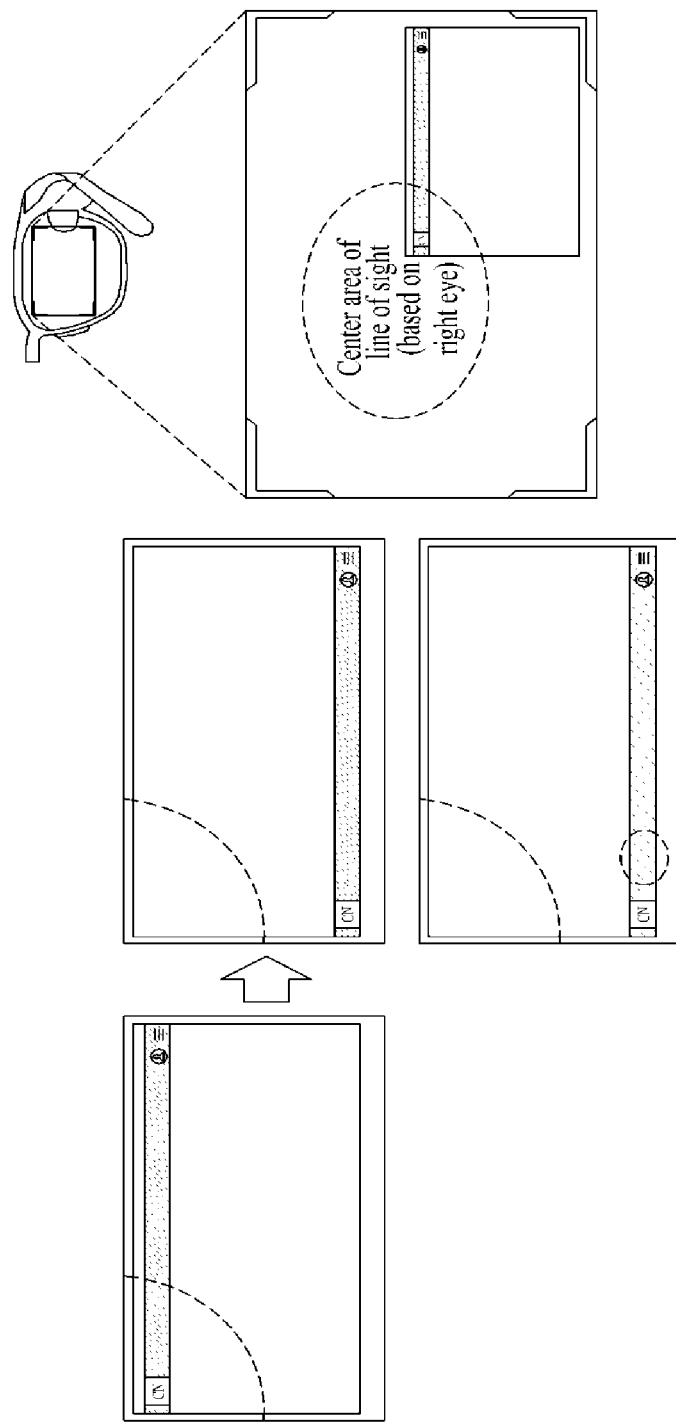
FIG. 15 is a diagram for describing an operation of providing a guideline for content that obstructs a line of sight of a user in an embodiment.

FIG. 15 is a diagram for describing an operation of providing a guideline for content that obstructs a line of sight of a user in an embodiment.

A guideline for content that obstructs a line of sight of a user may be provided. Quality for reporting can be improved by using a pre-examination function through a system based on the provided guideline. FIG. 15 illustrates an example of a content guideline. When card-based content is configured, if dark color or bold words close to a center area of a line of sight of a user is present, obstruction of a line of sight for the corresponding content may be additionally determined. A result of the determination may be reported to a content creator. For example, a black menu may be disposed in the center area of the line of sight of the user. Accordingly, obstruction of the line of sight can be minimized by placing the black menu at the bottom of the content. Furthermore, if a user moves or is placed on the outside, translucent treatment may be performed in order to prevent content from hiding a line of sight of a user.

Figure 16:
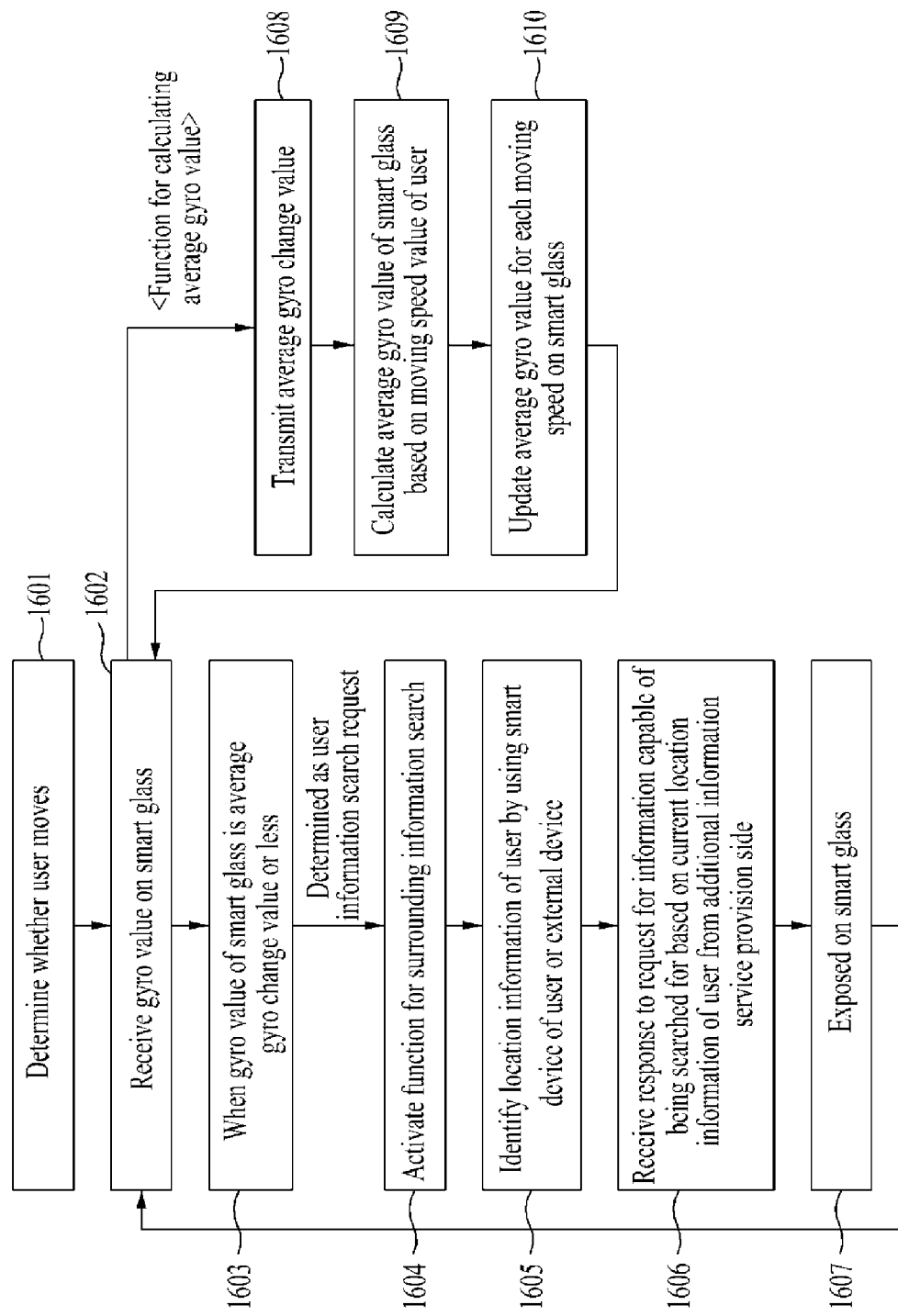
FIG. 16 is a diagram for describing an operation of determining a request for search for information from a user in smart glass in an embodiment.

FIG. 16 is a diagram for describing an operation of determining a request for search for information from a user in smart glass in an embodiment.

Smart glass may basically need to recognize specific information gazed by a user and perform information search, in addition to an explicit information search request from the user. If information search is performed by using smart glass, whether the information search corresponds to an information search request of a user may be determined by using the following methods. If the time when a pupil gazes at a specific target is greater than a threshold value through eye tracking, related information search may be performed. Alternatively, if a change in the gyro value of the smart glass is reduced while a user walks, it may be determined that the user gazes at corresponding information. An average of moving speed values of a user and a change in the gyro value according to paces may be measured in association with a smart phone. A change in the average of gyro values of walks for each user may be calculated based on the measured change in the gyro values. In this case, a gyro value change threshold in the smart glass of the user may be set. When information is searched for and exposed, a proper gyro value may be extracted based on feedback from the user. Furthermore, information search of the user may be performed by recognizing a command based on audio detection. Furthermore, information search may be performed based on a cooperation determination using an explicit response from a user. A gesture (e.g., a change in twisting a wrist or clenching a fist) using a smart watch, shaking a smart phone, or a touch may be inputted as the explicit response.

FIG. 16 is an example of a method of determining an information search request from a user on smart glass. Whether the user moves may be determined (1601). For example, whether the user moves may be determined by using smart glass, a smart watch, a smart phone, or various external devices of the user. A gyro value on the smart glass may be received (1602). In this case, in order to derive an average gyro value, an average gyro change value may be transmitted (1608), an average gyro value of the smart glass may be calculated based on a moving speed value of the user (1609), and an average gyro value for each moving speed on the smart glass may be updated on (1610). The updated average gyro value for each moving speed may be received. When the gyro value of the smart glass is the average gyro change value or less (1603), a function for surrounding information search may be activated by determining a user information search request (1604). Location information of the user may be confirmed by using a smart device of the user or an external device (1605). A response to a request for information which may be searched for based on current location information of the user may be received from an additional information service provision side (1606). The information requested through the response may be exposed on the smart glass (1607).

Furthermore, an operation of reducing battery power of the smart glass is described. It is difficult for an operation of the smart glass to be always in an on state due to a battery issue. The smart glass may need to rapidly recognize the moment when a user himself or herself requires information. To this end, action information of the user may be inferred by using a sensor of the smart glass, a surrounding device, etc. or may be predicted through learning. In this case, location information, information that may be learnt, timing at which information is discovered, etc. may be used. The location information may be updated in association with a smart phone, a smart watch, or a vehicle. Intent of the user may be learnt and inferred by using a routine in everyday life, an information call history, purchase experiences, etc. When a user gazes at specific information, the smart glass may basically need to perform information search by recognizing the gazed specific information, in addition to an explicit information search request of a user.

Furthermore, an operation using smart glass in a situation in which a key update is impossible is described. Security may be reinforced when information is confirmed between an IBD and a smart device by using a key provided on an information platform. If a user carries only smart glass (i.e., a situation in which a key update is impossible), payment of a minimum (set amount) level is possible based on the most recently updated key information. A maximum value proposed in a platform is different for each credit card registration user and each direct payment card registration user. If a maximum value is associated with a service such as BNPL (Buy Now or Pay Later), the maximum value is based on an amount provided by a corresponding service.

Figure 17:
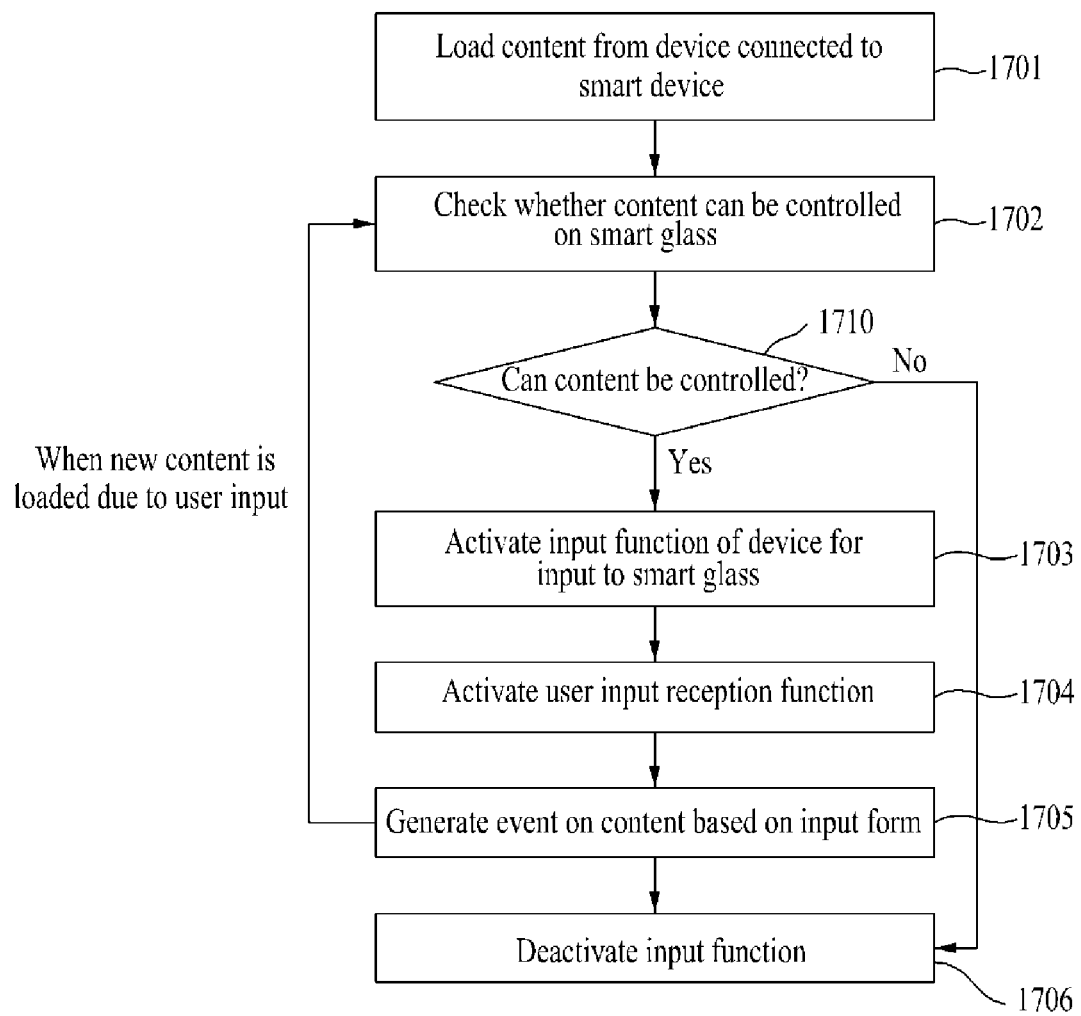
FIG. 17 is a diagram for describing an operation of controlling smart glass through an input to a smart device in a locked state in an embodiment.
Figure 18:
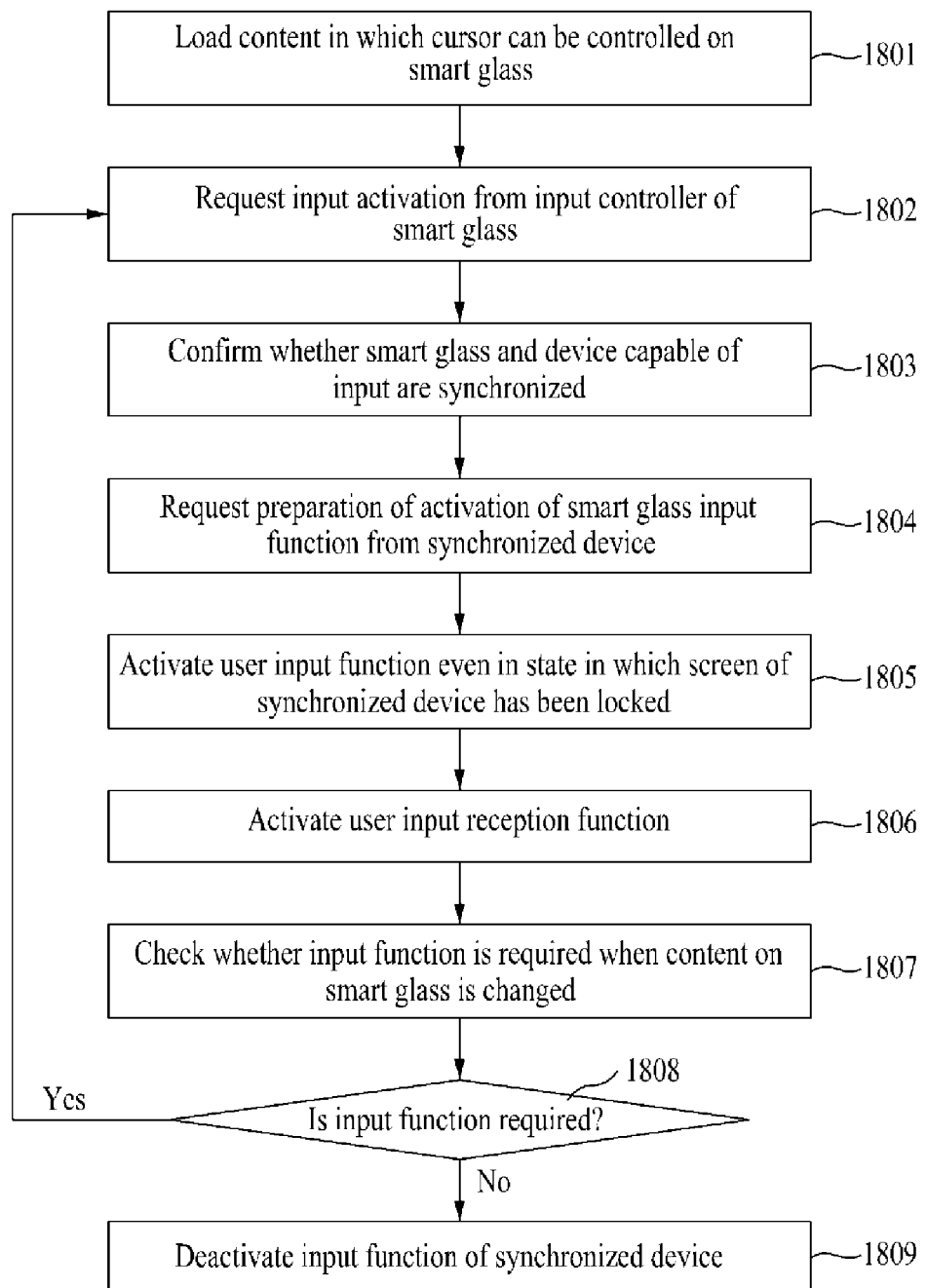
FIG. 18 is a diagram for describing an operation of controlling smart glass through an input to a smart device in a locked state in an embodiment.
Figure 19:
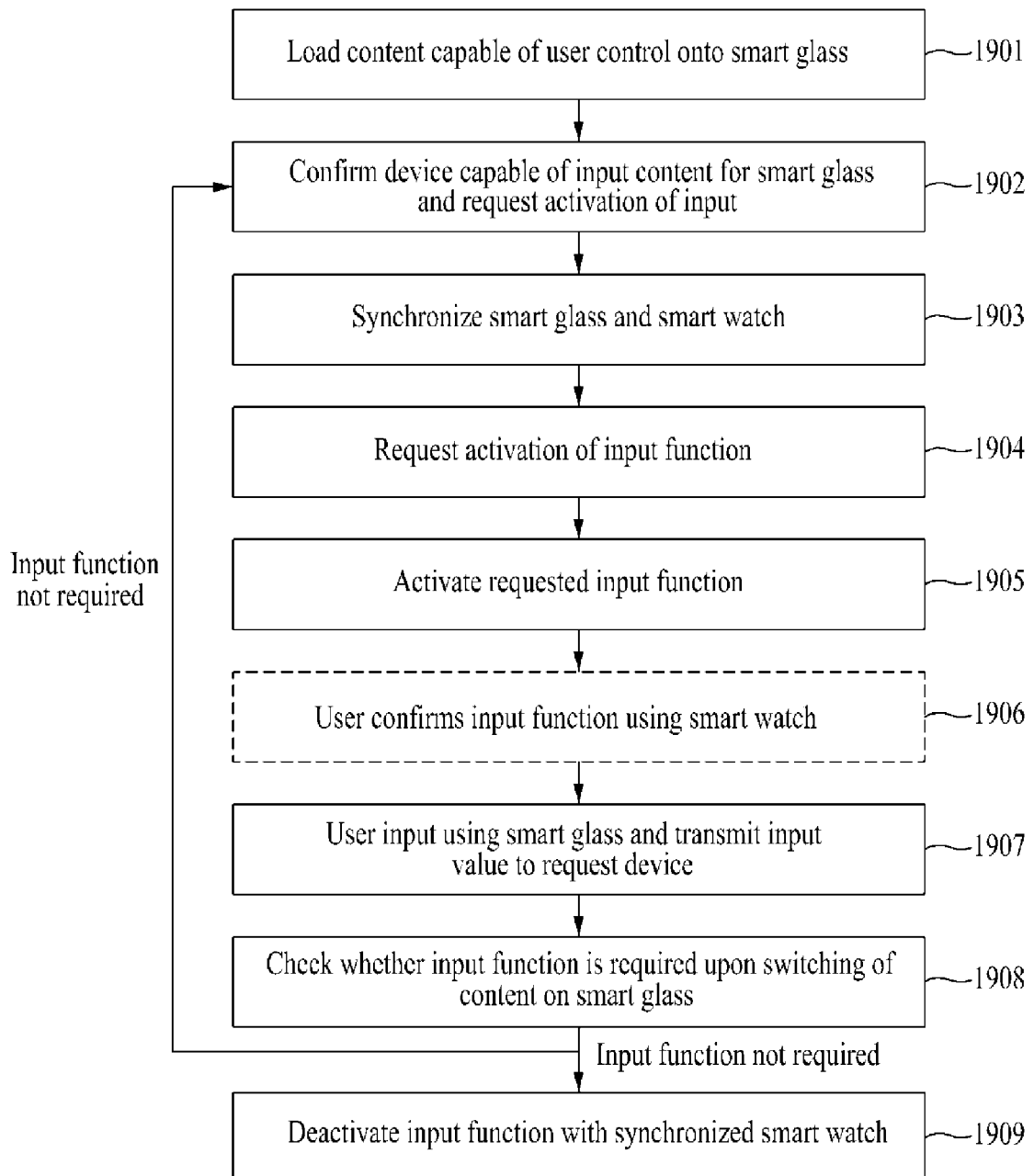
FIG. 19 is a diagram for describing an operation of controlling smart glass through an input to a smart device in a locked state in an embodiment.

FIGS. 17 to 19 describe operations of controlling smart glass through an input to a smart device in a locked state in an embodiment. For control of smart glass, a smart device of a user which may be associated with the smart glass may be used.

A touch screen of a smart phone, a tablet, or a smart watch may be used in a touch pad form for controlling the smart glass. In the case of the smart glass, there is a difficulty in a user control input. In particular, selection using a cursor, etc. is vulnerable. In order to improve such a problem, a touch pad input function may be supported by using a smart device having an input interface among devices around the smart glass. For example, in the state in which a smart phone or a smart watch has been locked, a touch pad input function may be used as an input interface for the smart glass. In other words, a user experience, such as a touch pad of Apple Inc. may be provided. In this case, connection timing of the surrounding device and a scheme for activating the input interface in the state in which a screen has been locked are required.

Referring to FIG. 17, a method of controlling smart glass when content is loaded through a smart device is described. Content may be loaded from a smart device (e.g., a smart phone in FIG. 17) connected to smart glass (1701). A case where content is loaded onto smart glass may be divided into a case where the content is loaded through a smart device when and a case where the content is independently onto smart glass. If the content is loaded through the smart device, when a content type and characteristic are recognized in the smart device, the content is exposed on the smart glass and an input activation function may be simultaneously activated. Whether the content is content in which a cursor can be controlled on the smart glass may be checked (1702). In this case, if connection or control information (e.g., a hyperlink, a video, or a slide) is present in a configuration of the content, a content characteristic, such as a case where the content is configured in multiple card forms when a content format for the smart glass is generated, may be determined. Whether the content is content in which a cursor can be controlled may be determined (1702). If the content is content in which a cursor can be controlled, an input function of a device for an input to the smart glass may be activated (1703). For example, the smart glass may be controlled through the input of a control instruction of a user using voice data from a voice input device, such as the microphone of a smart phone, the smart glass may be controlled through the input of a control instruction of a user using a gesture from sensors including an acceleration sensor and gyro sensor mounted on a smart phone, or the smart glass may be controlled through the input of a control instruction of a user using a gesture of a wrist or finger from an electromyogram sensor attached to a smart phone. In this case, the input function of the smart phone may be activated from timing at which content is provided on the smart glass. A user input reception function may be may be activated (1704). An event on the content may occur based on an input form (1705). Since content rendering is directly processed in the smart phone, processing a corresponding content event in the smart phone is effective. In this case, if new content is loaded due to the user input, step 1702 may be performed. Furthermore, if the content is content that does not require control, the input function may be deactivated (1706).

Referring to FIG. 18, an operation of controlling smart glass when content is independently loaded onto the smart glass is described. Content in which a cursor, etc. may be controlled may be loaded onto smart glass (1801). Input activation may be requested from the input controller of the smart glass (1802). Whether the smart glass and a device (e.g., a smart phone in FIG. 18) capable of an input are synchronized may be checked (1803). The preparation of the activation of a smart glass input function may be requested from the synchronized device (i.e., the smart phone) (1804). The synchronized device may wait for a user input in the state in which a screen has been locked. After receiving a request for the input waiting from the smart glass, the smart glass input function may be activated based on an input pattern designated by the user. When a user designation input is present on a screen in the state in which a screen has been locked, the synchronized device (i.e., the smart phone) may determine the user designation input and operate in a touch pad form of the smart glass. When an input having a horizontal form is present in the state in which a screen has been locked, the synchronized device may determine the input having the horizontal form and operate in the touch pad form of the smart glass. The user input function may be activated even in the state in which a screen of the synchronized device has been locked (1805). A user input reception function may be activated (1806). When content on the smart glass is changed, whether an input function is required may be checked (1807). Whether the input function is required may be determined (1808). If the input function is required, the activation of an input may be requested from the input controller of the smart glass (1809). If the input function is not required, the input function of the synchronized device may be deactivated (1809).

FIG. 19 is a diagram for describing a method of controlling smart glass by using a smart watch. Content capable of user control may be loaded onto smart glass (1901). If the smart glass is controlled by using a smart watch, both a case where content is loaded through a smart device when the content is loaded onto the smart glass and a case where content is independently loaded onto the smart glass may be performed by synchronizing an input device in an individual device and triggering a user input. When a device capable of input content for the smart glass is confirmed, the activation of an input may be requested (1902). Information on a device capable of input control for the smart glass is based on information on a pre-paired device. A pairing function may be performed in response to a user request at corresponding timing. If a pre-paired device is present or if a user input is required upon switching of content on the smart glass, a synchronization execution procedure may be omitted. Synchronization between the smart glass and a smart watch may be performed (1903). The activation of an input function may be requested from the synchronized smart watch (1904). The synchronized smart watch may be activated so that the smart watch can be used as an input device in response to a request from an input unit (e.g., a touch screen unit, the stem of a watch, a button, or a gesture recognition function) of the smart watch. For example, the smart glass may be controlled in response to a control instruction of a user using an input function defined by the user by using the stem of the smart watch, the smart glass may be controlled through the input of a control instruction of a user using voice data from a voice input device, such as the microphone of a smart watch, the smart glass may be controlled through the input of a control instruction of a user using a gesture of a wrist from sensors including an acceleration sensor and gyro sensor mounted on a smart watch, or the smart glass may be controlled through the input of a control instruction of a user using a gesture of a wrist and finger from an electromyogram sensor attached to the band of a smart watch. In this case, which function will be activated may be different depending on a pre-configuration of a user or a requested input function. For example, if corresponding content having only a Submit/cancel form is present, the corresponding content may be selected through switching and a button by using the stem of a smart watch. Alternatively, if the use of a cursor on a screen is required and the number of areas in which content is selected is multiple, corresponding information may be rapidly selected through moving, a touch, etc, by using the touch input function of a smart watch. Accordingly, the function may previously provide information responsible for an input function, such as markup or an app, and a function for matching with an input function on the smart watch on a system or SDK, and may notify a user of a method of using the input function when the user is first synchronized with the smart watch. The requested input function may be activated (1905). The activation of the input function used by the user using the smart watch may be confirmed (1906). The user may explicitly determine whether to activate the input function. For example, whether a smart watch in a paired state will be used as an input tool of the smart glass may be determined through an action, such as shaking a wrist, clicking on a button, or double clicking a touch screen. The user input using the smart watch and an input value to a request device may be transmitted (1907). Whether an input function is required upon switching of content on the smart glass may be confirmed (1908). When it is determined that the input function is unnecessary, the input function of the synchronized smart watch may be deactivated (1909). When it is determined that the input function is necessary, step 1902 may be performed.

Figure 20:
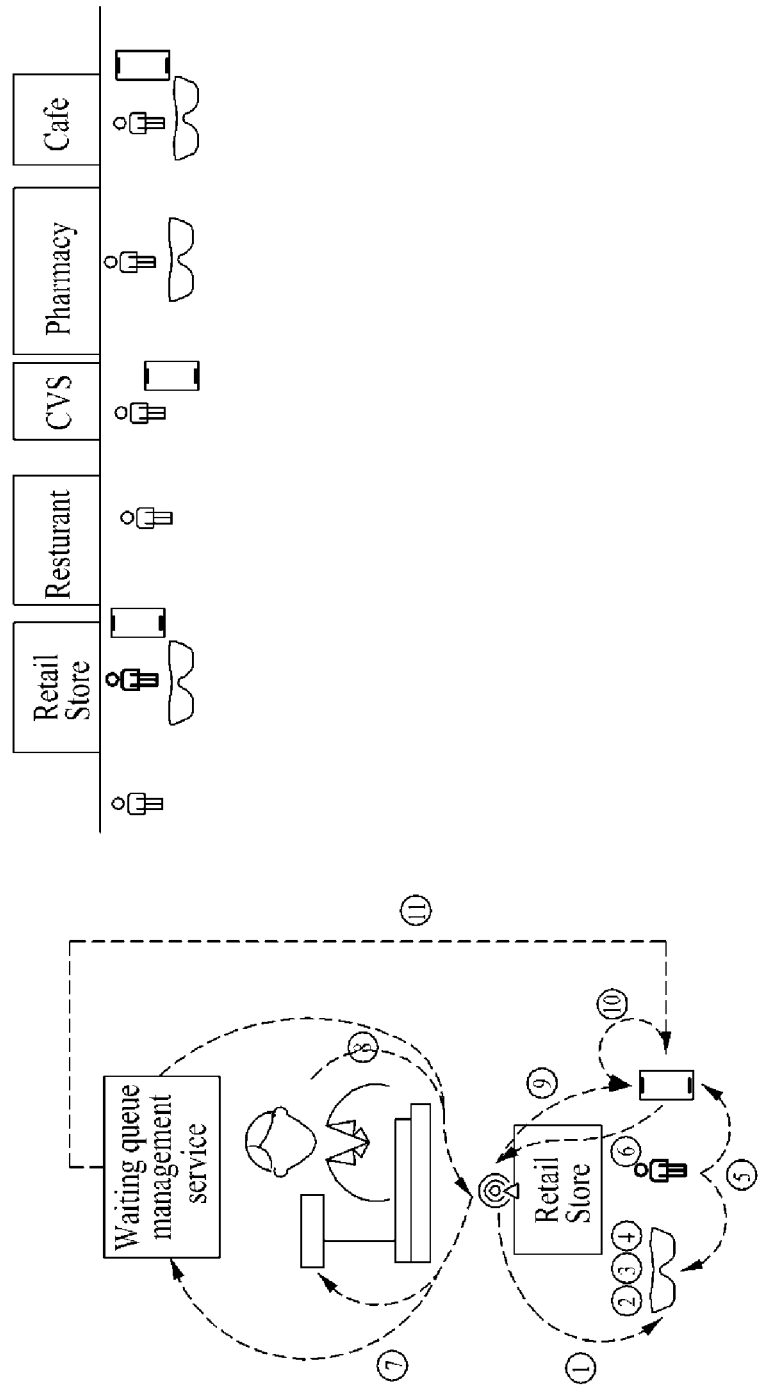
FIG. 20 is a diagram for describing an operation of registering a waiting queue with a retail store in an embodiment.

FIG. 20 is a diagram for describing an operation of registering a waiting queue with a retail store in an embodiment.

An IBD of a retail store may broadcast information (1). A smart device (e.g., smart glass or a user device) of a user may receive the broadcasted information (2). In this case, whether to expose the received information may be determined based on information on a level of interest of the user (3). Basic information on a retail store may be exposed on the smart glass (4). For example, waiting information of the retail store may be exposed on the smart glass. The user may request the registration of a waiting queue through a tab of the user by using the smart device or the smart glass (5). The smart device may request the registration of the waiting queue with the IBD of the retail store (6). The smart device may register the waiting request information of the user with a service, such as PoS or its own waiting queue management app (7). In this case, actual traffic may be transmitted through the device management system (for service recording and control). The IBD of the retail store may receive a response to the receipt of the registration of the user waiting request information (8). The IBD of the retail store may transmit the registration of the user waiting request information to the smart device (9). In this case, if a connection between the IBD and the smart device has not been established, a cellular network, etc. may be used. Waiting generation information may be registered with a wallet of the smart device or the service app (10). Thereafter, waiting call information may be transmitted to the smart device (11).

Figure 21:
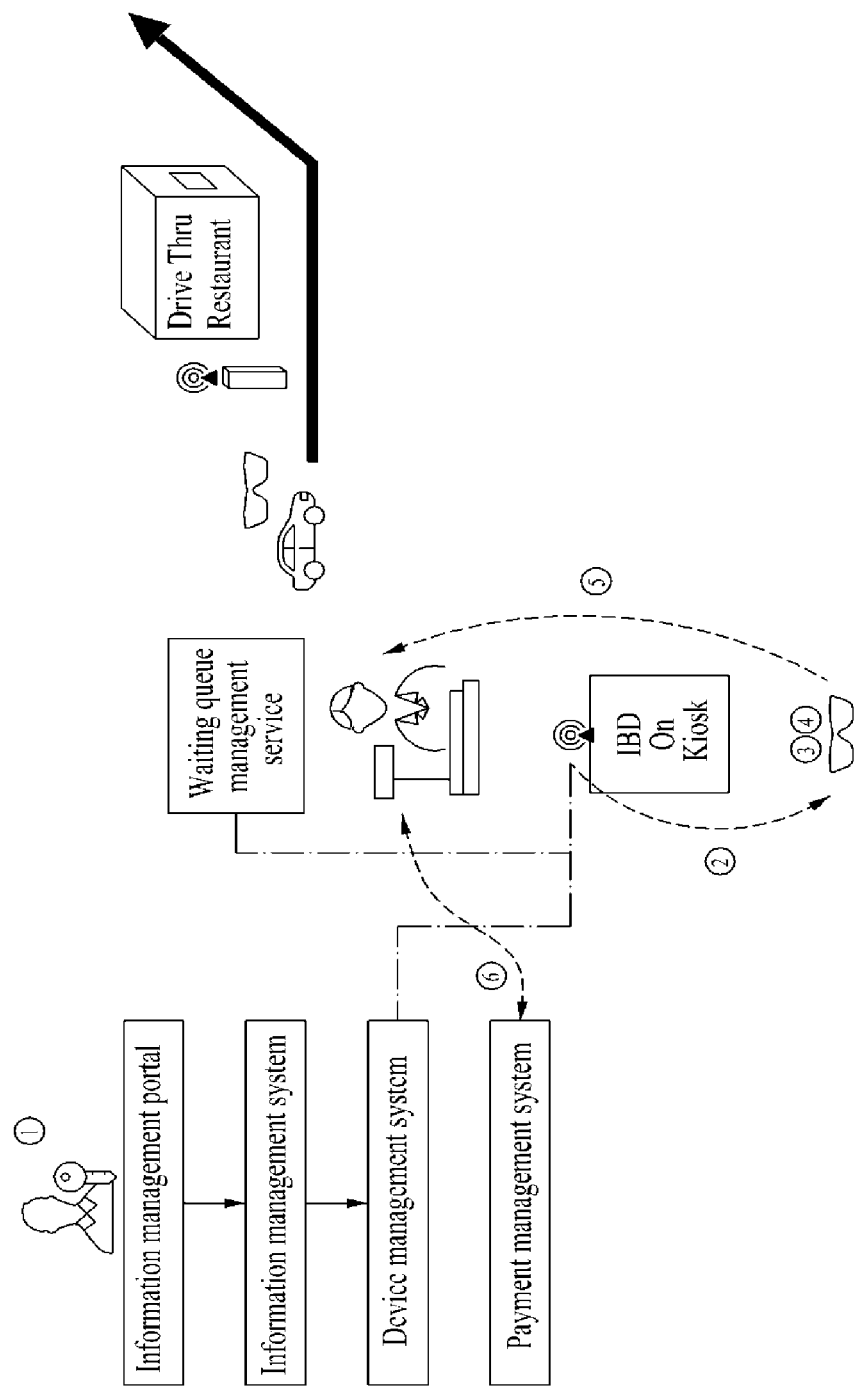
FIG. 21 is a diagram for describing a drive-through operation in an embodiment.

FIG. 21 is a diagram for describing a drive-through operation in an embodiment.

An information owner (or a store owner) may previously register an IBD to be used in a retail store through the information management system, and may configure service configuration information related to the retail store. In other words, a drive-through owner may broadcast information related to a waiting time for entry timing and a menu through its own IBD by using the information management portal (1). When a vehicle enters the drive-through store, the vehicle may receive the information from the IBD (2). The information (e.g., the waiting time) configured in the drive-through store may be exposed on smart glass (3). If the smart glass receives information even after a given time through a user input or a timer, the promotion or menu of the drive-through store may be transmitted (4). A menu may be ordered based on a voice order using the smart glass or menu information on the smart glass (5). Payment may be processed through a payment system connected to the smart glass (6). The user may pick up the ordered menu (7).

Figure 22:
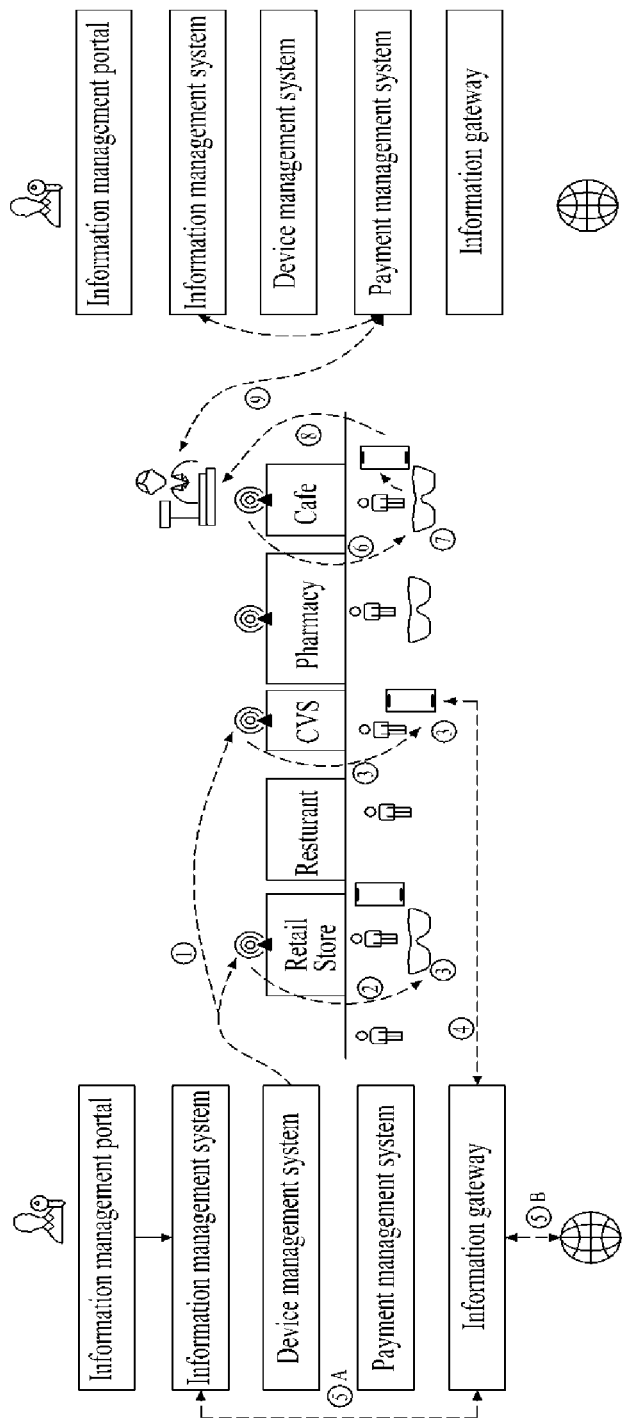
FIG. 22 is a diagram for an advertising and payment operation in an embodiment.

FIG. 22 is a diagram for an advertising and payment operation in an embodiment.

An information owner (or a store owner) may previously register an IBD to be used in his or her retail store and configure information to be broadcasted through the IBD, through the information management system. The device management system may transmit the information to the IBD (1). The IBD may broadcast the information (2). When a user device or smart glass receives the information, the information may be exposed in the user device or on the smart glass. The information gateway may be queried based on the received information (4). The query for the information gateway to the information management system or information to an external web service may be associated with each other (5). In this case, upon association with external information, an additional cost may occur because a unit cost according to information exposure is different.

Furthermore, the IBD may broadcast information (1). The received information may be exposed on the smart glass (2). Payment may be requested through the user device (3). In this case, the payment may be processed through an interaction having a limited number in the case of a small sum and through authentication, such as FIDO method authentication using the smart glass or an FIDO method of the user device in the case of a given amount or more. PoS may request the payment from the payment management system in response to a payment request through the user device. If payment-discounted information is present based on information registered with the information management system, the payment management system may process the payment based on an amount to which an information association discount has been applied (4).

Figure 23:
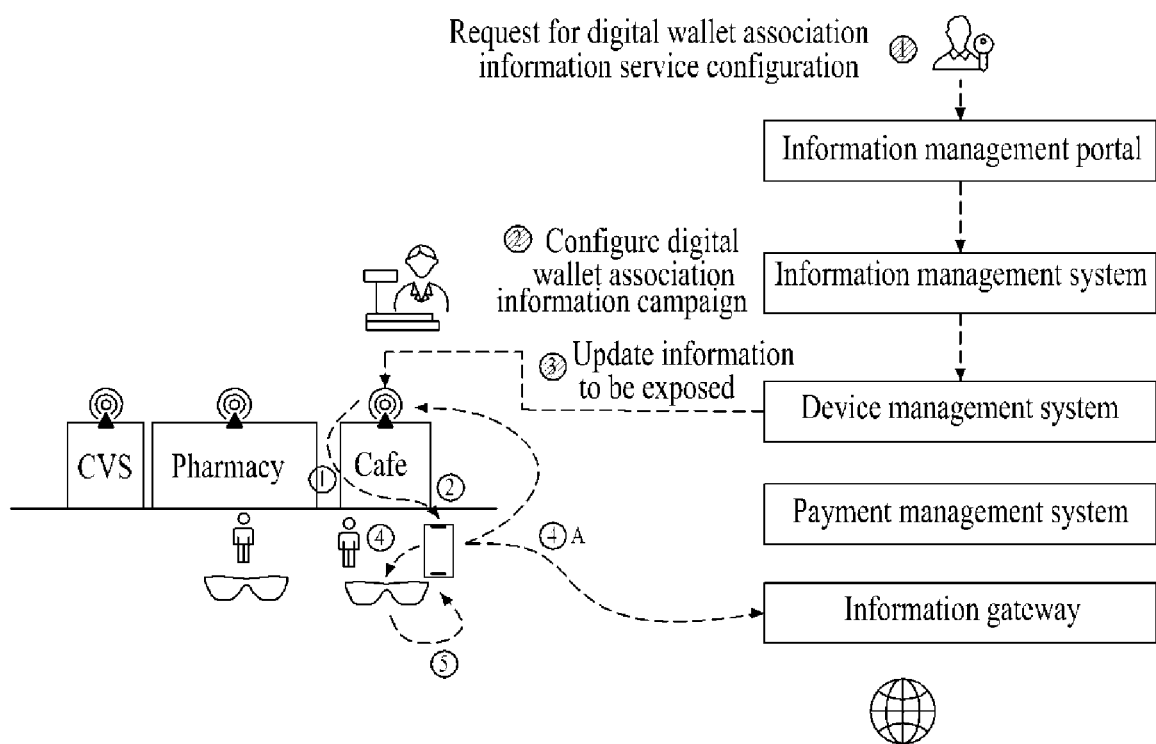
FIG. 23 is a diagram for describing a point/coupon association operation in an embodiment.

FIG. 23 is a diagram for describing a point/coupon association operation in an embodiment.

A user may be provided with a service associated with a digital wallet of a user device based on a message received from an IBD. To this end, if association information of the digital wallet of the user is included in an information message, the information message needs to include a key value of an information signal broadcasted by an authenticated IBD. A delimiter for identifying that corresponding information is information required to be identified in association with the digital wallet may be necessary. When providing an information service, an information owner may bear an additional information exposure cost.

The information owner may request a digital wallet association information service configuration (1). A digital wallet association information campaign may be configured, and the IBD may be updated with exposed information (2 and 3).

A point or coupon association service of a retail store is described. An IBD of a retail store may broadcast information (1). A smart device (e.g., a user device or smart glass) may receive the broadcasted information from the IBD, and may determine whether the received information is information with which association with a separate digital wallet has been requested (2). If the received information is information that requires association with the digital wallet, the smart device may confirm configuration information of the digital wallet of a user. If the user has been configured to be associated, the smart device may check an interested store registered with the digital wallet of the user or whether the user has previously used a corresponding retail store or association with point or coupon information, based on connection information provided to the information received by the user (3).

If association information based on the existing digital wallet of a user is present, the information may be exposed on the smart glass in association with related information (4). For example, the information may be exposed on the smart glass in association with whether an additional discount is provided by using a coupon or a specific free-use amount based on a point. The user may determine whether to perform consumption based on the information associated with his or her digital wallet.

Figure 24:
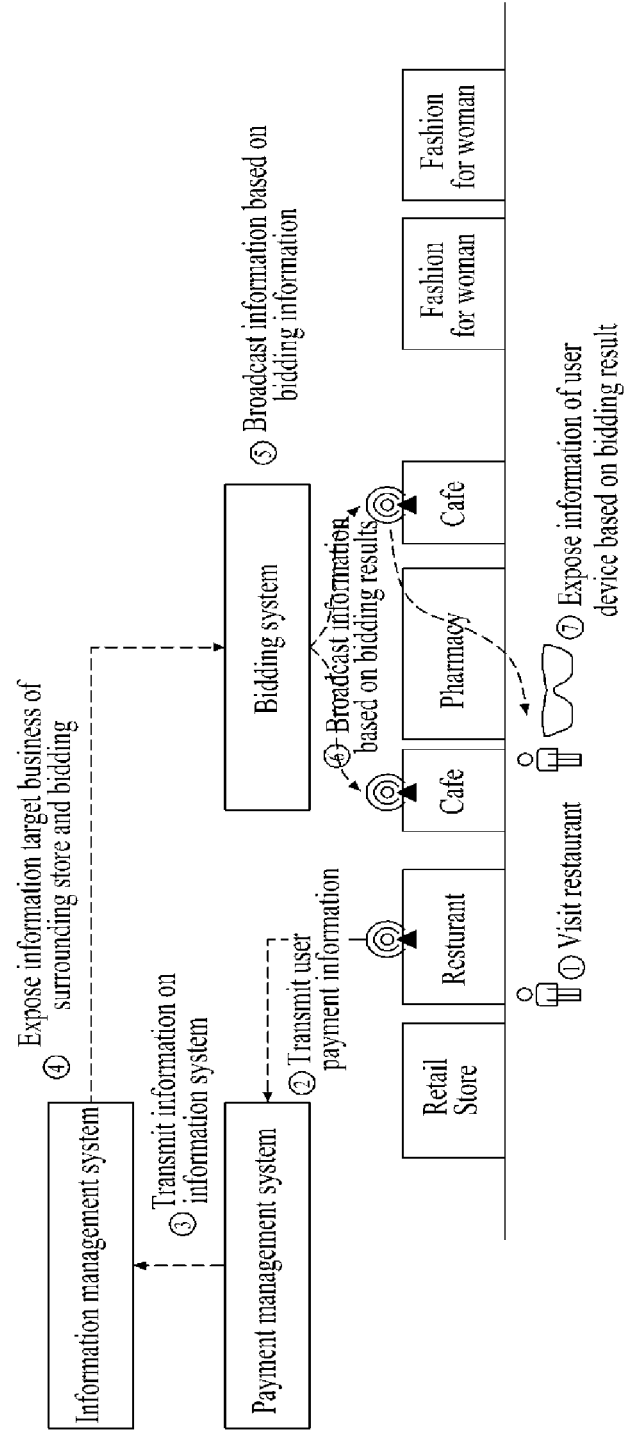
FIG. 24 is a diagram for describing a bidding operation when multiple IBDs are present in adjacent spaces in an embodiment.

FIG. 24 is a diagram for describing a bidding operation when multiple IBDs are present in adjacent spaces in an embodiment.

If multiple IBDs are present at adjacent distances, the delivery of information may need to be limited for user convenience. To this end, when the user visits a retail store having the same or similar sale item located at an adjacent distance, characteristics of information exposure for similar product stores nearby may be adjusted. If payment is performed through advertising exposure, such as food and drink in a cafe (a time characteristic), advertising exposure of the same retail store within a specific time may be excluded, or when a user has a meal, customized advertising having a form that increase a weight for a cafe may be provided. In the case of women's clothing related business (item characteristic) or women's clothing, if the same retail store is exposed, the corresponding store may be additionally exposed although payment is performed in the corresponding store.

A user may visit a restaurant (1). After visiting the restaurant and ordering food, when the user attempts to perform payment, payment information may be transmitted to the payment management system (2). The payment management system may transmit, to the information management system, order information including the payment information (3). The information management system may execute information exposure bidding for target business of a surrounding retail store (4). A bidding system may generate broadcasting information based on bidding information (5). The bidding system may transmit, to an IBD of the retail store, information based on the results of the bidding (6). The IBD that has won the bidding may expose, on smart glass, information according to the results of the bidding (7).

Figure 25:
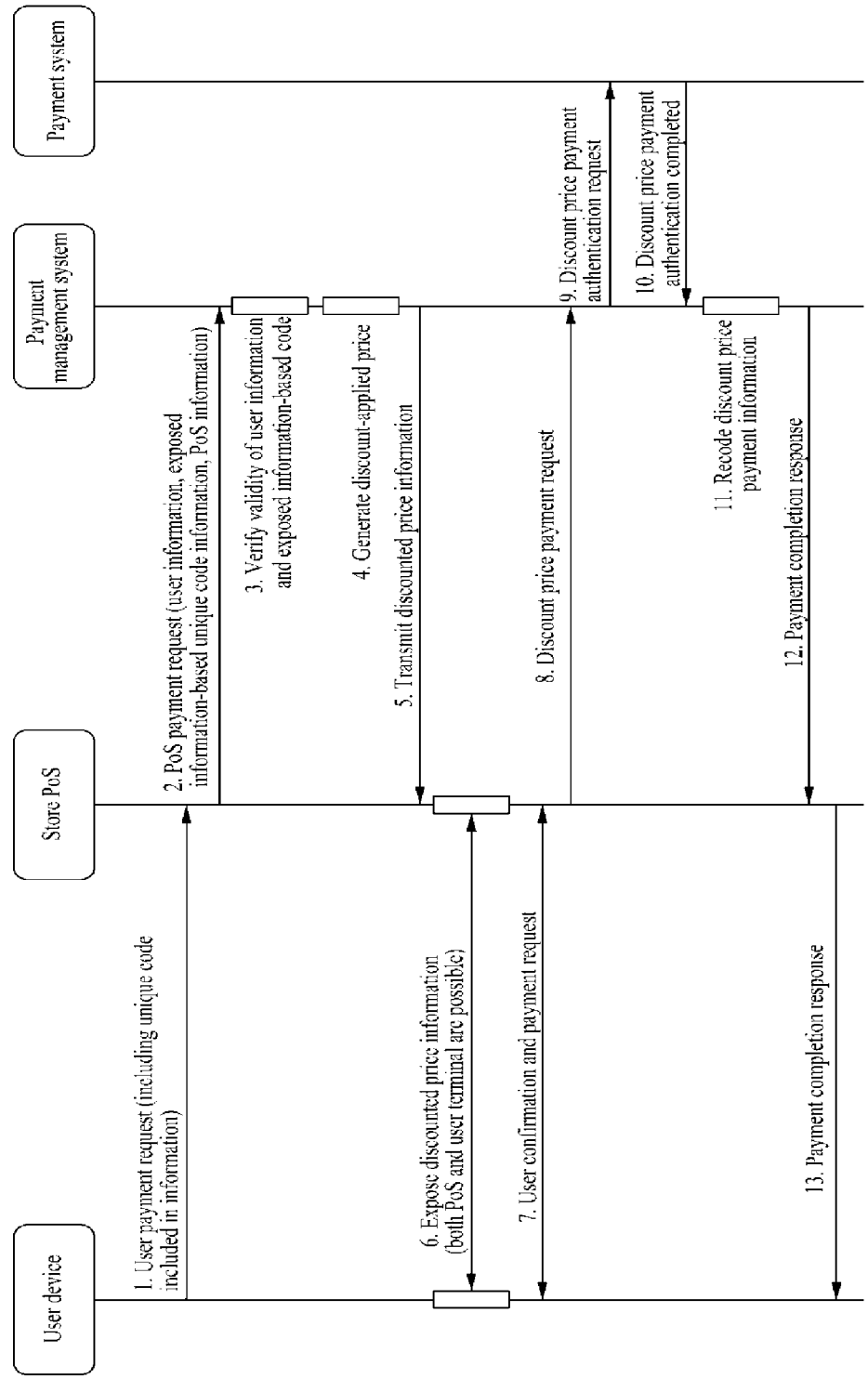
FIG. 25 is a diagram for describing a payment management operation in an embodiment.

FIG. 25 is a diagram for describing a payment management operation in an embodiment.

A user device may request the payment of a user including a unique code received through information exposed to PoS of a retail store (1). The PoS of the retail store may request, from the payment management system, PoS payment including user information, unique code information based on exposed information, and PoS information (2). The payment management system may verify the validity of the user information and the code information based on the exposed information (3). For example, the payment management system may previously store user information and code information based on exposed information. Accordingly, the payment management system may verify the validity of the user information and the code information by comparing the user information and the code information based on the exposed information, which have been previously stored, and the user information and the code information based on the exposed information, which are included in the payment request of the PoS of the retail store. The payment management system may generate a price to which a discount has been applied in performing the validity check (5). The payment management system may transmit, to the PoS of the retail store, information on the generated price to which the discount has been applied (6). The PoS of the retail store may expose the information on the generated price to which the discount has been applied to one or more of the PoS and/or a user device. The user may identify the information on the generated price to which the discount has been applied through the user device, and may request, from the PoS of the retail store, the payment of the price to which the discount has been applied (7). The PoS of the retail store transmit, to the payment management system, a payment request from the user for the price to which the discount has been applied (8). The payment management system may request, from a payment system, the authentication of the payment of the price to which the discount has been applied (9). The payment system may complete the authentication of the payment of the price to which the discount has been applied (10). The payment management system may record information on the payment of the price to which the discount has been applied (11). The payment management system may transmit, to the PoS of the retail store, a response to the completion of the payment of the price to which the discount has been applied (12). The PoS of the retail store may transmit, to the user device, a response to the completion of the payment of the price to which the discount has been applied (13).

FIG. 26 is a diagram for describing a digital wallet association operation of a user based on additional information in an embodiment.

A user device or smart glass of a user may receive a message in which digital wallet information is included in additional information (2601). If an information owner wants the broadcasting of information associated with the digital wallet of the user, the information owner may pay the information management system for an additional cost, and may configure information. If digital wallet association information is included in an additional campaign, the device management system may set a flag for a message, and may perform additional encryption (e.g., key information at corresponding timing). The decoding of the received message may be performed by using a key value of the user device or the smart glass (2602). The user device or the smart glass may perform the decoding of the message received from an IBD of the information owner by using a key received from the device management system. To this end, the IBD may need to be capable of periodically communicating with a key management system of the device management system. If an offline state of the IBD continues and a valid period has expired, a connection with the digital wallet cannot be performed due to an authentication failure. A message for requesting digital wallet information may be obtained (2603). A request for association with the digital wallet of the user may be additionally confirmed in the received message. A sand box for the request for digital wallet information by the user may be invoked (2604). For security enhancement, the digital wallet may be invoked through the sand box not a method of directly invoking the digital wallet. In this case, a direct invoking method is also possible. Key information updated on the digital wallet of the user and key information of the requested message may be confirmed (2605). An authentication key of a digital wallet may be periodically updated for security purposes on a platform, or may be updated in a casual form when a user accesses a specific area. In this case, the update may be performed by a push or based on device GPSs or a previously configured service zone on the server side. Accordingly, security can be enhanced. When the validity of the key is confirmed, the digital wallet information of the user may be invoked (2606). An authentication key of a digital wallet may be periodically updated for security purposes on a platform, or may be updated in a casual form when a user accesses a specific area. In this case, the update may be performed by a push or based on device GPSs or a previously configured service zone on the server side. Accordingly, security can be enhanced. When the digital wallet of the user is searched for, a response to such information may be received (2607). Information on the sand box may be recorded, and the smart glass may be invoked (2608). A security issue and a service log can be managed by recording the information on the sand box. Furthermore, the sand box may provide a platform service provider with a result value in real time or in a log form. Accordingly, whether an actual service is matched can be managed. Digital wallet association information may be exposed on the smart glass (2609).

The aforementioned device may be implemented as a hardware component, a software component and/or a combination of a hardware component and a software component. For example, the device and component described in the embodiments may be implemented using a processor, a controller, an arithmetic logic unit (ALU), a digital signal processor, a microcomputer, a field programmable gate array (FPGA), a programmable logic unit (PLU), a microprocessor, or one or more general-purpose computers or special-purpose computers, such as any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may understand that the processing device may include a plurality of processing elements and/or a plurality of types of processing elements. For example, the processing device may include a plurality of processors or a single processor and a single controller. Furthermore, a different processing configuration, such as a parallel processor, is also possible.

Software may include a computer program, a code, an instruction or a combination of one or more of them and may configure a processing device so that the processing device operates as desired or may instruct the processing devices independently or collectively. The software and/or the data may be embodied in any type of machine, a component, a physical device, a computer storage medium or a device in order to be interpreted by the processor or to provide an instruction or data to the processing device. The software may be distributed to computer systems connected over a network and may be stored or executed in a distributed manner. The software and the data may be stored in one or more computer-readable recording media.

The method according to an embodiment may be implemented in the form of a program instruction executable by various computer means and recorded on a computer-readable recording medium. The computer-readable recording medium may include a program instruction, a data file, and a data structure alone or in combination. The program instruction recorded on the medium may be specially designed and constructed for an embodiment, or may be known and available to those skilled in the computer software field. Examples of the computer-readable recording medium include magnetic media such as a hard disk, a floppy disk and a magnetic tape, optical media such as a CD-ROM and a DVD, magneto-optical media such as a floptical disk, and hardware devices specially configured to store and execute a program instruction, such as a ROM, a RAM, and a flash memory. Examples of the program instruction include not only machine language code produced by a compiler, but a high-level language code which may be executed by a computer using an interpreter, etc.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The invention claimed is:

1. A method for processing a service in association with a smart glass, the method performed by a computer device, comprising:
   registering, from an information owner through an information management portal service provided on an information platform, service configuration information to be broadcasted through an information broadcasting device (IBD);
   in response that the service configuration information being broadcasted through the IBD, providing service information related to the service configuration information to at least one smart glass which receives the service configuration information; and
   in response to a service request of a user of the smart glass, processing a service associated with the service information,
      wherein the information broadcasted through the IBD comprises information on a retail store, and a user device associated with the smart glass receives a message including request information for associating with a digital wallet of the user, and
      wherein the processing comprises verifying the request information by decoding the message using a key value of the user device; and
   providing, on the smart glass, a point or a coupon information associated with the information on the retail store,
      wherein the providing comprises, in response to a determination that an association with the digital wallet is required on the user device, discovering association information including an interested store registered with the digital wallet, information on whether the user has previously used the retail store, or point or coupon information associated with the digital wallet, based on connection information provided to the information received by the user; and
   providing, on the smart glass, the information on the retail store and the association information.

2. The method of claim 1, wherein the information broadcasted through the IBD comprises information on a retail store, and wherein the providing comprises providing, on the smart glass, waiting information as the service information based on the information on the retail store.

3. The method of claim 1, wherein the information broadcasted through the IBD comprises information on a retail store, and wherein the providing comprises providing, on the smart glass, waiting time information with respect to an entrance timing of a vehicle to the retail store and menu information of the retail store as the service information based on the information on the retail store.

4. The method of claim 1, wherein the information broadcasted through the IBD comprises information on a retail store, and wherein the providing comprises providing, on the smart glass, the service information based on the information on the retail store, and wherein an information gateway is queried based on the service information, and the information gateway transmits a query to an information management system or associates the service information with an external service.

5. The method of claim 1, wherein the information broadcasted through the IBD comprises payment information, and wherein the providing comprises providing, on the smart glass, discount information as the service information based on payment information.

6. The method of claim 1, wherein waiting information on a retail store is displayed on the smart glass as the service information, and wherein the processing comprises registering the user to a waiting list in response to a waiting list registering request related to the waiting information as the service request.

7. The method of claim 1, wherein waiting time and menu information on a retail store is displayed on the smart glass as the service information, and wherein the processing comprises processing the service including an ordering service and a payment service in response to an ordering request related to the waiting time and the menu information as the service request.

8. The method of claim 1, wherein payment information on a retail store is displayed on the smart glass as the service information, and wherein the processing comprises processing the service including a payment service with a discount in response to a payment request related to the payment information as the service request and authentication for the payment using the smart glass or a user device associated with the smart glass.

9. A computer device for processing a service in association with a smart glass, the computer device comprising:
   at least one processor configured to execute computer-readable instructions included in a memory,
   wherein the at least one processor is configured to:
      register, from an information owner through an information management portal service provided on an information platform, service configuration information to be broadcasted through an information broadcasting device (IBD);

in response that the service configuration information being broadcasted through the IBD, provide service information related to the service configuration information to at least one smart glass which receives the service configuration information; and in response to a service request of a user of the smart glass, process a service associated with the service information, wherein the information broadcasted through the IBD comprises information on a retail store, and a user device associated with the smart glass receives a message including request information for associating with a digital wallet of the user, wherein the at least one processor is configured to verify the request information by decoding the message using a key value of the user device, and provide, on the smart glass, a point or a coupon information associated with the information on the retail store, and wherein the at least one processor is configured to, in response to a determination that an association with the digital wallet is required on the user device, discovery association information including an interested store registered with the digital wallet, information on whether the user has previously used the retail store, or point or coupon information associated with the digital wallet, based on connection information provided to the information received by the user, and provide, on the smart glass, the information on the retail store and the association information.

* * * * *